United States Patent
Chen et al.

(10) Patent No.: US 12,361,036 B2
(45) Date of Patent: Jul. 15, 2025

(54) VISUAL DIALOG METHOD AND APPARATUS, METHOD AND APPARATUS FOR TRAINING VISUAL DIALOG MODEL, ELECTRONIC DEVICE, AND COMPUTER-READABLE STORAGE MEDIUM

(71) Applicant: Tencent Technology (Shenzhen) Company Limited, Shenzhen (CN)

(72) Inventors: Feilong Chen, Shenzhen (CN); Fandong Meng, Shenzhen (CN); Peng Li, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 364 days.

(21) Appl. No.: 17/989,613

(22) Filed: Nov. 17, 2022

(65) Prior Publication Data

US 2023/0082605 A1 Mar. 16, 2023

Related U.S. Application Data

(63) Continuation of application No. PCT/CN2021/102815, filed on Jun. 28, 2021.

(30) Foreign Application Priority Data

Aug. 12, 2020 (CN) .......................... 202010805359.1

(51) Int. Cl.
G06F 16/3329 (2025.01)
G06F 16/334 (2025.01)
G06F 16/583 (2019.01)

(52) U.S. Cl.
CPC ...... *G06F 16/3329* (2019.01); *G06F 16/3347* (2019.01); *G06F 16/583* (2019.01)

(58) Field of Classification Search
CPC . G06F 16/3329; G06F 16/583; G06F 16/3347
See application file for complete search history.

(56) References Cited

U.S. PATENT DOCUMENTS

| 2006/0123358 | A1 | 6/2006 | Lee et al. | |
| 2021/0303605 | A1* | 9/2021 | He | G06N 5/02 |
| 2023/0177581 | A1* | 6/2023 | Ren | G06Q 30/0282 |
| | | | | 705/26.7 |

FOREIGN PATENT DOCUMENTS

| CN | 103049433 A * | 4/2013 | G06F 17/27 |
| CN | 105574133 A | 5/2016 | |

(Continued)

OTHER PUBLICATIONS

Tencent Technology, WO, PCT/CN2021/102815, Sep. 28, 2021, 5 pgs.

(Continued)

*Primary Examiner* — Mohammad K Islam
(74) *Attorney, Agent, or Firm* — Morgan, Lewis & Bockius LLP

(57) ABSTRACT

Disclosed in this application are a visual content dialog method performed by an electronic device. The method includes: acquiring an image feature of an input image and state vectors corresponding to first n rounds of historical question answering dialog, n being a positive integer; acquiring a question feature of a current round of questioning related to the input image; performing multimodal encoding on the image feature of the input image, the state vectors corresponding to the first n rounds of historical question answering dialog, and the question feature of the current round of questioning, to obtain a state vector corresponding to the current round of questioning; and perform- (Continued)

ing multimodal decoding on the state vector corresponding to the current round of questioning and the image feature of the input image, to obtain an actual output answer corresponding to the current round of questioning.

20 Claims, 11 Drawing Sheets

(56) References Cited

FOREIGN PATENT DOCUMENTS

| | | | | |
|---|---|---|---|---|
| CN | 109359196 A | | 2/2019 | |
| CN | 110309850 A | * | 10/2019 | .......... G06F 11/3688 |
| CN | 110609891 A | | 12/2019 | |
| CN | 111309883 A | | 6/2020 | |
| CN | 111460121 A | | 7/2020 | |
| CN | 111897940 A | | 11/2020 | |
| CN | 110609891 B | * | 6/2021 | ......... G06F 16/3329 |
| CN | 113392288 A | * | 9/2021 | ....... G06F 16/90332 |
| CN | 111460121 B | * | 7/2022 | ......... G06F 16/3329 |
| WO | WO 2006062620 A2 | | 6/2006 | |

OTHER PUBLICATIONS

Tencent Technology, IPRP, PCT/CN2021/102815, Feb. 7, 2023, 6 pgs.
Tencent Technology, ISR, PCT/CN2021/102815, Sep. 28, 2021, 3 pgs.

* cited by examiner

VISUAL DIALOG METHOD AND APPARATUS, METHOD AND APPARATUS FOR TRAINING VISUAL DIALOG MODEL, ELECTRONIC DEVICE, AND COMPUTER-READABLE STORAGE MEDIUM

CROSS-REFERENCE TO RELATED APPLICATIONS

This application is a continuation application of PCT Patent Application No. PCT/CN2021/102815, entitled "VISUAL DIALOGUE METHOD AND APPARATUS, MODEL TRAINING METHOD AND APPARATUS, ELECTRONIC DEVICE, AND COMPUTER READABLE STORAGE MEDIUM" filed on Jun. 28, 2021, which claims priority to Chinese Patent Application No. 202010805359.1, filed with the State Intellectual Property Office of the People's Republic of China on Aug. 12, 2020, and entitled "VISUAL DIALOGUE METHOD, VISUAL DIALOGUE MODEL TRAINING METHOD, DEVICE AND EQUIPMENT", all of which are incorporated herein by reference in their entirety.

FIELD OF THE TECHNOLOGY

This application relates to the field of visual dialog, and in particular, to a visual dialog method and apparatus, a method and an apparatus for training visual dialog model, an electronic device, and a computer-readable storage medium.

BACKGROUND OF THE DISCLOSURE

Visual dialog is a process of engaging in meaningful dialog with humans in a conversational language of natural language in response to visual content (for example, an image).

Generally, to implement visual dialog, an output answer to a current input question is usually obtained based on an input image, the current input question, a previous round of historical question answering dialog, and an operating state vector at a previous moment. However, in the above technical solution for obtaining an output answer, the accuracy of an output answer is low when an input question carries more information.

SUMMARY

Embodiments of this application provide a visual dialog method and apparatus, a method and an apparatus for training visual dialog model, an electronic device, and a computer-readable storage medium. Information included in an input image is acquired by combining first n rounds of historical question answering dialog, so that the accuracy of an output answer to an input question can be improved. The technical solutions in the embodiments of this application are as follows:

The embodiments of this application provide a visual content dialog method, the method including:
  acquiring an image feature of an input image and state vectors corresponding to first n rounds of historical question answering dialog, n being a positive integer;
  acquiring a question feature of a current round of questioning related to the input image;
  performing multimodal encoding on the image feature of the input image, the state vectors corresponding to the first n rounds of historical question answering dialog, and the question feature of the current round of questioning, to obtain a state vector corresponding to the current round of questioning; and
  performing multimodal decoding on the state vector corresponding to the current round of questioning and the image feature of the input image, to obtain an actual output answer corresponding to the current round of questioning.

The embodiments of this application provide a method for training a visual dialog model, the method including:
  acquiring an image feature sample of an input image sample and state vector samples corresponding to first s rounds of historical question answering dialog samples, s being a positive integer;
  acquiring a question feature sample of a current round of questioning samples and a first answer feature of an actual answer corresponding to the current round of questioning samples;
  performing multimodal encoding on the image feature sample, the state vector samples corresponding to the first s rounds of historical question answering dialog samples, and the question feature sample by invoking a visual dialog model, to obtain a state vector sample corresponding to the current round of questioning samples; and
  performing multimodal decoding on the state vector sample corresponding to the current round of questioning samples, the image feature sample, and the first answer feature by invoking the visual dialog model, to obtain a second answer feature of an actual output answer sample corresponding to the current round of questioning samples; and
  training the visual dialog model according to the first answer feature and the second answer feature, to obtain the trained visual dialog model.

The embodiments of this application provide a visual dialog apparatus, the apparatus including:
  a first acquisition module, configured to acquire an image feature of an input image and state vectors corresponding to first n rounds of historical question answering dialog, n being a positive integer,
  the first acquisition module being configured to acquire a question feature of a current round of questioning related to the input image;
  a first feature encoding module, configured to perform multimodal encoding on the image feature of the input image, the state vectors corresponding to the first n rounds of historical question answering dialog, and the question feature of the current round of questioning, to obtain a state vector corresponding to the current round of questioning; and
  a first feature decoding module, configured to perform multimodal decoding on the state vector corresponding to the current round of questioning and the image feature of the input image, to obtain an actual output answer corresponding to the current round of questioning.

The embodiments of this application provide an apparatus for training a visual dialog model, the apparatus including:
  a second acquisition module, configured to acquire an image feature sample of an input image sample and state vector samples corresponding to first s rounds of historical question answering dialog samples, s being a positive integer,
  the second acquisition module being configured to acquire a question feature sample of a current round of questioning samples and a first answer feature of an actual answer corresponding to the current round of questioning samples;

a second feature encoding module, configured to perform multimodal encoding on the image feature sample, the state vector samples corresponding to the first s rounds of historical question answering dialog samples, and the question feature sample by invoking a visual dialog model, to obtain a state vector sample corresponding to the current round of questioning samples;

a second feature decoding module, configured to perform multimodal decoding on the state vector sample corresponding to the current round of questioning samples, the image feature sample, and the first answer feature by invoking the visual dialog model, to obtain a second answer feature of an actual output answer sample corresponding to the current round of questioning samples; and a training module, configured to train the visual dialog model according to the first answer feature and the second answer feature, to obtain the trained visual dialog model.

The embodiments of this application provide an electronic device, the electronic device including a processor and a memory, the memory storing at least one instruction, the at least one instruction being executed by the processor and causing the electronic device to implement the foregoing visual content dialog method and method for training a visual dialog model.

The embodiments of this application provide a non-transitory computer-readable storage medium, the computer-readable storage medium storing at least one instruction, the at least one instruction being executed by a processor of an electronic device and causing the electronic device to implement the foregoing visual content dialog method and method for training a visual dialog model.

The embodiments of this application provide a computer program product or a computer program. The computer program product or the computer program includes computer instructions, and the computer instructions are stored in a computer-readable storage medium. A processor of the electronic device reads the computer instructions from the computer-readable storage medium, and the computer instructions, when being executed by the processor, cause the electronic device to perform the foregoing visual dialog method and method for training a visual dialog model.

The beneficial effects brought by the technical solutions provided in the embodiments of this application are at least as follows:

An input image and first n rounds of historical question answering dialog related to the input image are processed, so that implicit information in the input image can be better understood in combination with the context, and a multimodal encoding mode and a multimodal decoding mode are used, so that an actual output answer corresponding to a current round of questioning can be better outputted accurately according to various types of information, thereby improving the accuracy of the output answer.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
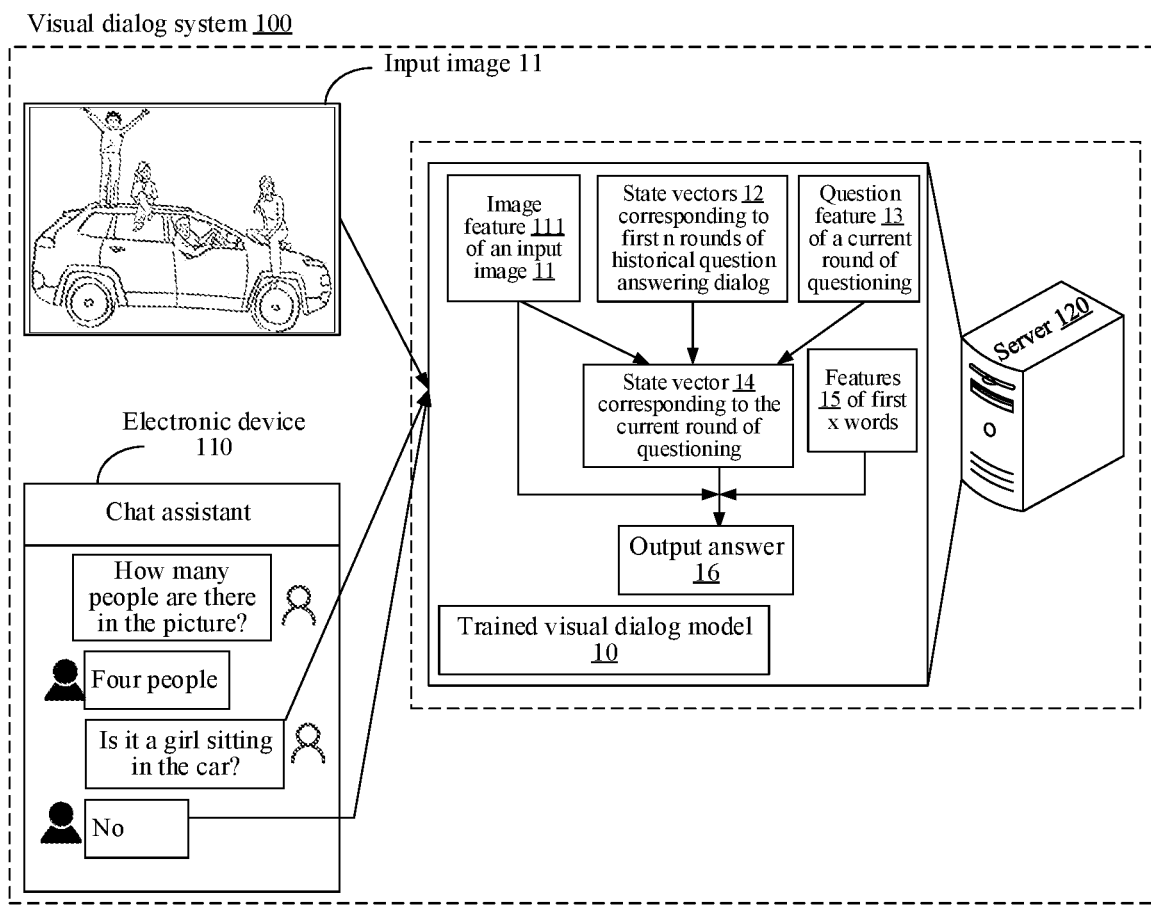
FIG. 1 is a framework diagram of a visual dialog system according to an exemplary embodiment of this application.

To make the objectives, technical solutions, and advantages of this application clearer, the implementations of this application are further described below in detail with reference to the accompanying drawings.

First, the terms described in the embodiments of this application are introduced.

1) Computer vision (CV) is a science that studies how to use a machine to "see", and that uses a camera and a computer to replace human eyes to perform machine vision processing such as recognition, tracking, and measurement on a target, and perform graphic processing, so that a processing result becomes an image more suitable for human eyes to observe, or an image transmitted to an instrument for detection. As a scientific discipline that studies theories and technologies related to CV research, CV technology is used for establishing an AI system that can obtain information from images or multidimensional data. The CV technologies generally include technologies such as image processing, image recognition, image semantic understanding (ISU), image retrieval, optical character recognition (OCR), video processing, video semantic understanding, video content/behavior recognition, three-dimensional object reconstruction, a three-dimensional (3D) technology, virtual reality, augmented reality, synchronous positioning, and map construction, and further include biological feature recognition technologies such as common face recognition and fingerprint recognition. In the embodiments of this application, an input image is processed by using the CV technology, and an answer is outputted according to an input question. The input question is a question related to the input image.

2) Visual Question Answering (VQA) is a learning task involving the computer vision field and the Natural Language Processing (NLP) field. An image and a question in a free-form, opened natural language related to the image are inputted into an electronic device, and an output is a generated answer in the natural language. During VQA, the electronic device acquires the content of the image, the meaning and intent of the question, and the information about related common knowledge, and outputs an appropriate answer meeting natural language rules according to the inputted image and question.

3) Visual Dialog is the extended field of VQA and has a major task of engaging in meaningful dialog with humans in a conversational language of natural language in response to visual content. That is, an image, a dialog history, and a question about the image are given. The electronic device places the question in the image, inters the context from the dialog history, and answers the question accurately. What is different from VQA is that in visual dialog, a plurality of rounds of dialog history are processed by using an encoder that can combine a plurality of signal sources.

4) AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science that utilizes the essence of intelligence to produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role. In the embodiments of this application, visual dialog is implemented based on AI technology.

A visual dialog method provided in the embodiments of this application is applicable to the following scenarios.

1. Smart Customer Service

In the application scenario, a visual dialog model trained by using the visual dialog method provided in the embodiments of this application is applicable to applications such as a shopping application, a group buying application, and a travel management application (for example, a ticket booking application and a hotel booking application). Smart customer service is set in the foregoing applications. A user may have dialog with the smart customer service to obtain answers to questions that need to be solved. Smart customer service is implemented by using a visual dialog model constructed in a backend server of an application. The visual dialog model is trained beforehand. When the visual dialog model receives a question inputted by a user, the visual dialog model outputs an answer to the question. For example, the smart customer service is customer service of a shopping application. A question raised by a user is about an object A in an input image. The question is: Is there a shop selling an object A? The smart customer service outputs an answer according to the question of the user: Shop 1, Shop 3, and Shop 10 sell the object A. The user may browse corresponding shop interfaces according to the outputted answer.

2. Virtual Assistant

In the application scenario, a visual dialog model trained by using the visual dialog method provided in the embodiments of this application is applicable to a smart terminal, smart home, or another smart device. A virtual assistant set in a smart terminal is used as an example. The virtual assistant is implemented by using a trained visual dialog model. The visual dialog model is trained beforehand. When the visual dialog model receives a question inputted by a user, the visual dialog model outputs an answer to the question. For example, a user A sends a post (the post includes an image) on a social platform. The image is a photo of the user A vacationing on a beach. A virtual assistant prompts a user B (the user A and the user B are friends on the social platform) that the user A has posted a new photo. The user B asks the virtual assistant a question: What is the photo about? The virtual assistant outputs an answer: The user A is playing on a beach. The user B may select whether to enter the social platform interface of the user A to browse the photo.

The two application scenarios are only used as examples for description above. The visual dialog method provided in the embodiments of this application are applied to another scenario that requires visual dialog (for example, a scenario of explaining a picture to a visually impaired person). A specific application scenario is not limited in the embodiments of this application.

The visual dialog method and the method for training a visual dialog model provided in the embodiments of this application may be applied to an electronic device with a relatively high data processing capability. In a possible implementation, the visual dialog method and the method for training a visual dialog model provided in the embodiments of this application may be applied to a personal computer, a workstation or a server. That is, visual dialog and the training of a visual dialog model may be implemented by using a personal computer, a workstation or a server.

A trained visual dialog model may be implemented as a part of an application and is mounted on a terminal. In this case, when receiving a question related to an input image, the terminal can output an answer corresponding to the question. Alternatively, the trained visual dialog model is set in a backend server of an application, to allow a terminal with the application installed to implement the function of engaging in visual dialog with a user through the backend server.

FIG. 1 is a schematic diagram of a visual dialog system according to an exemplary embodiment of this application. The visual dialog system 100 includes an electronic device 110 and a server 120. The electronic device 110 and the server 120 perform data communication through a communication network. In some embodiments, the communication network may be a wired network or may be a wireless network. The communication network may be at least one of a local area network, a metropolitan area network, or a wide area network.

An application supporting a visual dialog function is installed on the electronic device 110. The application may be a virtual reality (VR) application, an augmented reality (AR) application, a game application, an album application, a social application, or the like. This is not limited in the embodiments of this application.

In the embodiments of this application, the electronic device 110 may be a smartphone, a smartwatch, a tablet computer, a laptop portable notebook computer, a smart robot, an in-vehicle device, or another mobile terminal, or may be a desktop computer, a projection computer, a smart television, or another terminal. The type of the electronic device is not limited in the embodiments of this application.

The server 120 may be implemented as a server or may be implemented as a server cluster formed by a group of servers, and may be a physical layer or may be implemented as a cloud server. In a possible implementation, the server 120 is a backend server of the application in the electronic device 110.

As shown in FIG. 1, in the embodiments of this application, a chat application is run on the electronic device 110. A user may acquire information in an input image by chatting with a chat assistant of the chat application. Schematically, the input image 11 is an image inputted in the server 120 by the electronic device 110 in advance. Alternatively, the input image 11 is an image prestored in the server 120. The user inputs a question related to the input image in a chat interface of the chat assistant. The electronic device 110 sends the question to the server 120. A trained visual dialog model 10 is set on the server 120. The trained visual dialog model 10 outputs an answer according to the inputted question, and sends the answer to the electronic device 110. The answer to the question from the chat assistant is displayed on the electronic device 110. For example, a user raises a question: Is it a girl sitting in the car? The trained visual dialog model 10 determines, according to several previous rounds of historical question answering dialog (Question: How many people are there in the image? Answer: Four people.) that the question raised by the user is about the gender of a person in the car in the input image, and gives an answer "no" according to the gender of people in the car being male.

Schematically, the server 120 prestores state vectors 12 corresponding to first n rounds of historical question answering dialog (n is a positive integer). When acquiring an image feature 111 of the input image 11 and a question feature 13 of a current round of questioning, the trained visual dialog model 10 outputs a state vector 14 corresponding to the current round of questioning by combining the state vectors 12 corresponding to the first n rounds of historical question answering dialog. The trained visual dialog model 10 obtains an $(x+1)^{th}$ character string in an output answer 16 according to the image feature 111 of the input image 11, the state vector 14 corresponding to the current round of questioning, and features 15 of outputted first x character strings, x being a positive integer.

In some embodiments of this application, the server 120 may prestore the first n rounds of historical question answering dialog. The visual dialog model extracts corresponding state vectors from the first n rounds of historical question answering dialog.

During training, the visual dialog model needs to be trained by combining an image feature sample of an input image sample, a state vector sample corresponding to the current round of questioning samples, and an answer feature of an actual answer corresponding to the current round of questioning samples. For example, when the actual answer of the current round of questioning samples includes five words (a character string), when outputting an answer, the visual dialog model outputs an actual output answer sample of each round of questioning according to a rule of outputting one word each time. When the visual dialog model outputs the third word, the visual dialog model outputs the third word by combining the first word and the second word in the actual answer and the state vector corresponding to the current round of questioning, and trains the visual dialog model based on a difference between the actual answer and the actual output answer sample.

For ease of description, an example in which the method for training a visual dialog model and the visual dialog method are performed by a server is used for description below.

Figure 2:
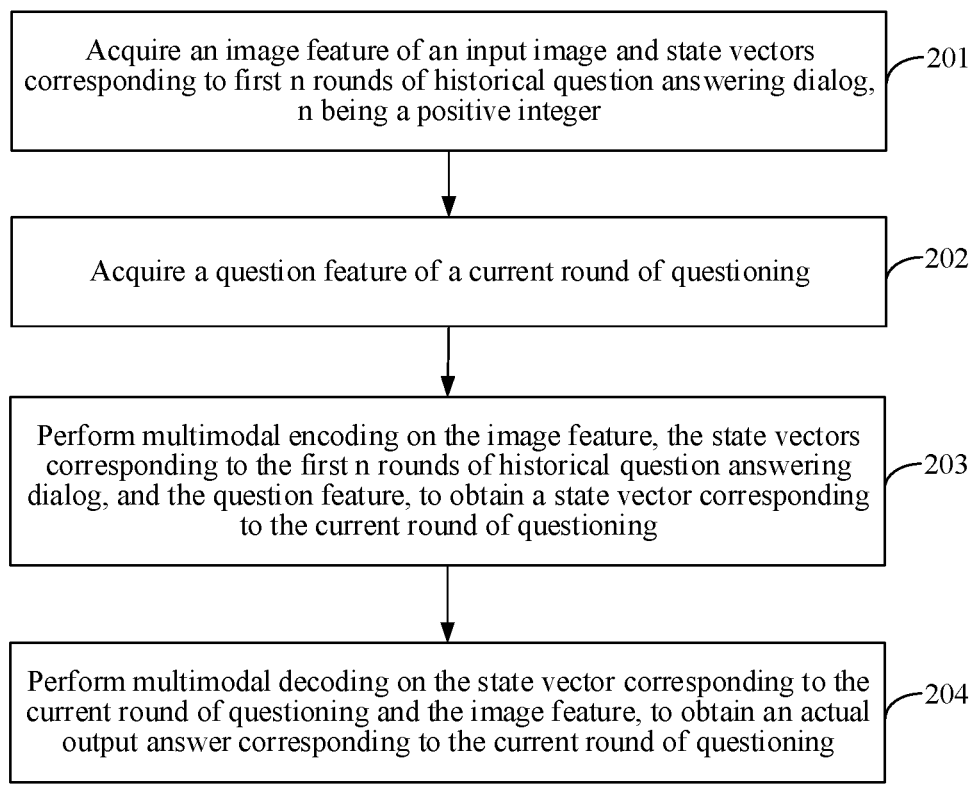
FIG. 2 is a flowchart of a visual dialog method according to an exemplary embodiment of this application.

FIG. 2 is a flowchart of a visual dialog method according to an exemplary embodiment of this application. The embodiments of this application are described by using an example in which the visual dialog method is applied to the server 120 in the visual dialog system 100 shown in FIG. 1. The visual dialog method includes the following steps:

Step 201: Acquire an image feature of an input image and state vectors corresponding to first n rounds of historical question answering dialog, n being a positive integer.

In the embodiments of this application, the server extracts a feature of the input image, that is, acquires the image feature of the input image. The state vectors corresponding to the first n rounds of historical question answering dialog are an output of a previous round, so that the server can acquire the state vectors corresponding to the first n rounds of historical question answering dialog from the output of the previous round.

Schematically, the server constructs a visual dialog model. The visual dialog model is obtained through training. That is, the trained visual dialog model is obtained. An input image is acquired by using the visual dialog model. The input image may be an image prestored in the server or may be an image (including at least one of an image stored in the terminal or an image photographed by the terminal) uploaded by a user to the server by using a terminal or may be an image in an existing image set. The type of the image is not limited in the embodiments of this application.

The visual dialog model extracts the image feature from the input image. In some embodiments of this application, the visual dialog model includes a feature extraction model. The image feature is extracted from the input image by using the feature extraction model.

One round of historical question answering dialog starts when the user raises a question and ends when the visual dialog model outputs an answer to the question. The question and the answer form one round of historical question answering dialog.

Schematically, the n rounds of historical question answering dialog are historical question answering dialog about one same input image. The server establishes a correspondence relationship between the n rounds of historical question answering dialog about one same input image and the input image. When the question raised by the user is a question about the input image, the visual dialog model acquires first n rounds of historical question answering dialog about the input image. In an example, the question raised by the user is about an image 1, the visual dialog model acquires $n_1$ rounds of historical question answering dialog corresponding to the image 1. Next, the user raises a question about an image 2. The visual dialog model acquires $n_2$ rounds of historical question answering dialog corresponding to the image 2, $n_1$ and $n_2$ being both positive integers.

Figure 3:
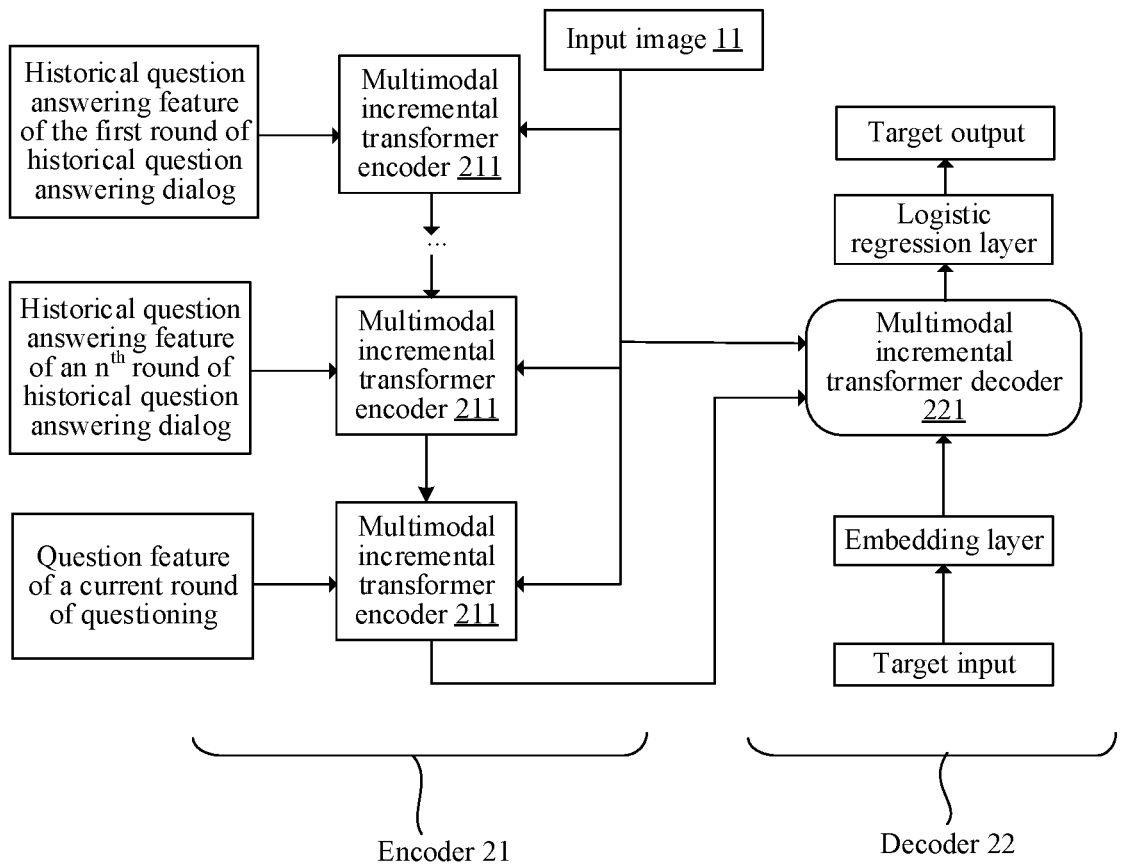
FIG. 3 is a structural framework diagram of a visual dialog model according to an exemplary embodiment of this application.

Schematically, as shown in FIG. 3, the visual dialog model includes an encoder 21. The encoder 21 includes a plurality of multimodal incremental transformer encoders (MITE) 211. A corresponding MITE 211 is set for each round of historical question answering dialog. When the MITE 211 of each round of historical question answering dialog outputs a state vector corresponding to the current round of historical question answering dialog, the image feature of the input image 11, a historical question answering feature of the current round of historical question answering dialog, and a state vector outputted by a MITE 211 corresponding to a previous round of historical question answering dialog further need to be combined as inputs, to obtain a state vector corresponding to each round of historical question answering dialog. For a MITE 211 corresponding to the first round, the image feature of the input image 11 and a question feature of the first round of questioning are used as inputs, and a state vector is outputted. The outputted state vector is transferred to a next round, until the processing reaches the current round. For a MITE 211 corresponding to the current round, the image feature of the input image 11, the question feature of the current round of questioning, and a state vector outputted by a MITE 211 corresponding to an $n^{th}$ round of historical question answering dialog are used as inputs, to obtain a state vector of the current round of questioning. In some embodiments of this application, the state vector corresponding to one round of historical question answering dialog includes a historical question answering feature corresponding to the round of historical question answering dialog.

Schematically, the server maps a text of historical question answering dialog into a word vector by using a word embedding operation, to obtain the historical question answering feature.

In some embodiments of this application, the state vector corresponding to one round of historical question answering dialog is obtained by using Formula (1). Formula (1) is:

$$c_n = \text{MITE}(v_n, u_n, c_{n-1}) \tag{1},$$

where $c_n$ represents a state vector corresponding to the $n^{th}$ round of historical question answering dialog outputted by a MITE, $v_n$ represents the image feature of the input image, $u_n$ represents a historical question answering feature (extracted from a text of historical question answering dialog) of the $n^{th}$ round of historical question answering dialog, and $c_{n-1}$ represents a state vector corresponding to an $(n-1)^{th}$ round of historical question answering dialog.

Step 202: Acquire a question feature of a current round of questioning related to the input image.

In the embodiments of this application, the server extracts a feature of a text corresponding to the current round of questioning, that is, obtains the question feature of the current round of questioning. In this way, the server may extract the question feature from the text of the current round of questioning by using the visual dialog model.

The embodiments of this application are described by using an example in which the question feature of the current round of questioning includes a word vector involved in the question and a position of the word vector.

Schematically, the server first maps each character string in the text of the current round of questioning by using a word embedding operation, to obtain a word vector of each character string, thereby obtaining a word vector corresponding to the text of the current round of questioning. Next, the server encodes each character string in the text of the current round of questioning according to a particular order through positional encoding, to obtain the position of each word vector corresponding to the text of the current round of questioning. The positional encoding includes absolute position encoding and relative position encoding. In this way, the question feature acquired by the server by using the visual dialog model includes a word vector and a position of each word vector in a sentence.

It may be understood that step 201 and step 202 may be implemented synchronously, or step 201 may be implemented before step 202 is implemented, or step 202 may be implemented before step 201 is implemented. That is, step 201 and step 202 are not performed in a fixed order.

Step 203: Perform multimodal encoding on the image feature of the input image, the state vectors corresponding to the first n rounds of historical question answering dialog, and the question feature of the current round of questioning, to obtain a state vector corresponding to the current round of questioning.

In the embodiments of this application, the server jointly performs multimodal encoding on the image feature, the state vectors corresponding to the first n rounds of historical question answering dialog, and the question feature. An obtained result is the state vector corresponding to the current round of questioning. The server may perform multimodal encoding by using the visual dialog model.

Schematically, the visual dialog model includes a corresponding MITE 211 set for each round of historical question answering dialog. A corresponding MITE 211 exists for the current round of questioning.

Schematically, the server uses the image feature and the historical question answering feature of the first round of historical question answering dialog as inputs of a MITE 211 corresponding to the first round of historical question answering dialog, and outputs a state vector corresponding to the first round of historical question answering dialog. The server uses the state vector corresponding to the first round of historical question answering dialog, a historical question answering feature of the second round of historical question answering dialog, and the image feature into a MITE 211 corresponding to the second around of historical question answering dialog, and outputs a state vector corresponding to the second around of historical question answering dialog. This process is repeated. The current round of questioning is an $(n+1)^{th}$ round. A state vector corresponding to an $n^{th}$ round of historical question answering dialog (an output of a MITE 211 corresponding to the $n^{th}$ round of historical question answering dialog), the image feature, and a question feature of the $(n+1)^{th}$ round of questioning are inputted into a MITE 211 corresponding to the $(n+1)^{th}$ round of questioning, to output a state vector corresponding to the $(n+1)^{th}$ round of questioning.

Step 204: Perform multimodal decoding on the state vector corresponding to the current round of questioning and the image feature of the input image, to obtain an actual output answer corresponding to the current round of questioning.

In the embodiments of this application, the server decodes the obtained state vector corresponding to the current round of questioning and the image feature. An obtained decoding result is the actual output answer corresponding to the current round of questioning. The decoding is multimodal decoding. The server may perform multimodal decoding by using the visual dialog model.

Schematically, continuing to refer to FIG. 3, as shown in FIG. 3, the visual dialog model further includes a decoder 22. The decoder 22 includes a multimodal incremental transformer decoder (MITD) 221. The state vector corresponding to the current round of questioning outputted by the MITE 221, and the image feature, and an output of an embedding layer corresponding to the outputted character string (a target input) are inputted into the MITD 221. An output of the MITD 221 passes through a logistic regression layer to obtain a character string (a target output) in the actual output answer corresponding to the current round of questioning.

For example, when a question of the current round of questioning is: "How are you?", the MITD combines outputted words (a character string) "I" and "am" and the state vector corresponding to the current round of questioning to output the word "fine".

It may be understood that in the visual dialog method provided in the embodiments of this application, state vectors corresponding to first n rounds of historical question answering dialog about an input image are acquired, so that the visual dialog model can consider the context to better understand implicit information in an image. A multimodal encoding mode and a multimodal decoding mode are used, so that the visual dialog model can better output an actual output answer corresponding to a current round of questioning according to various types of information, thereby improving the accuracy of an answer outputted by the visual dialog model, and ensuring the consistency of an output answer with a question and an input image to improve the effect of visual dialog.

Figure 4:
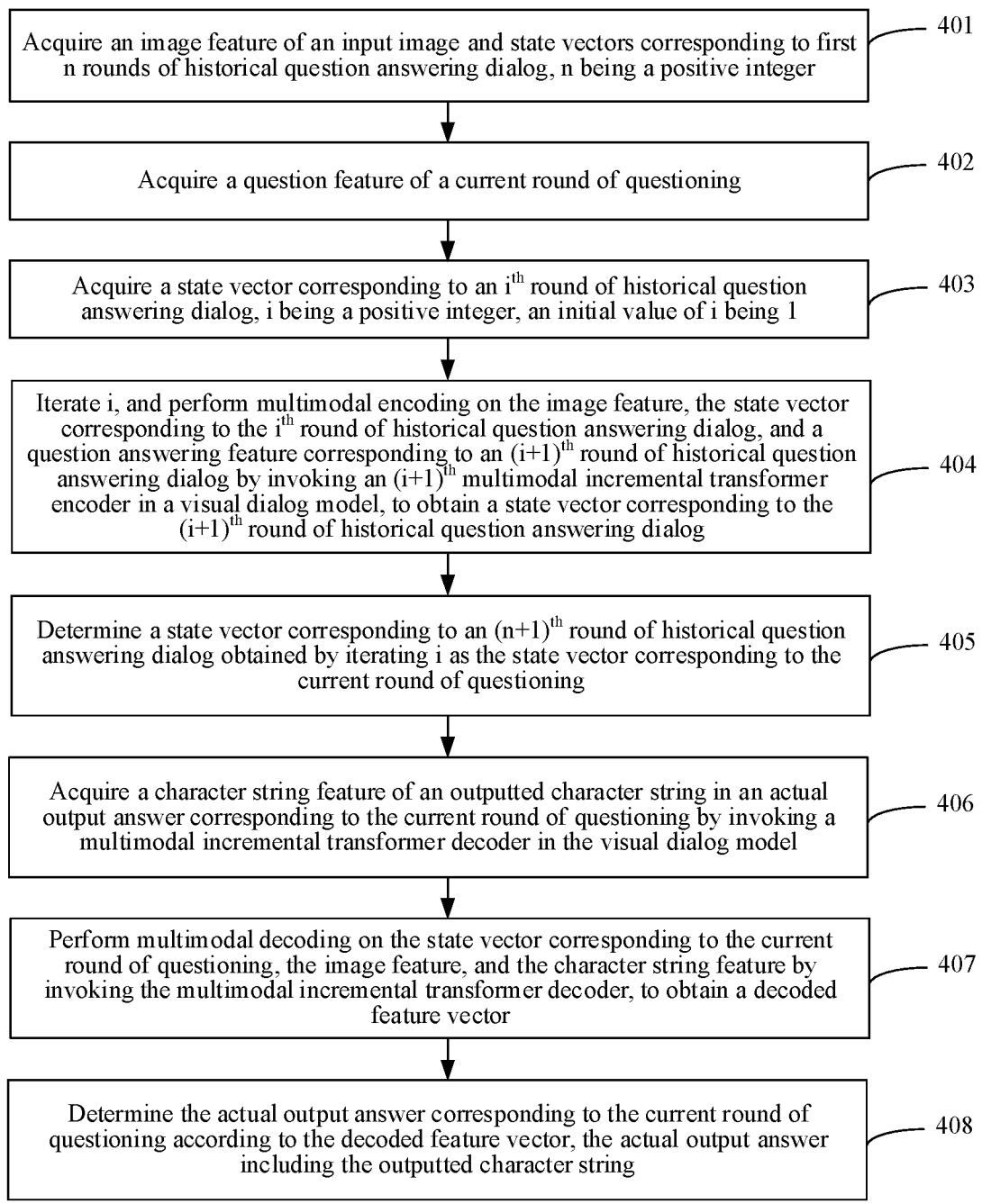
FIG. 4 is a flowchart of a visual dialog method according to another exemplary embodiment of this application.

FIG. 4 is a flowchart of a visual dialog method according to another exemplary embodiment of this application. The embodiments of this application are described by using an example in which the visual dialog method is applied to the server 120 in the visual dialog system 100 shown in FIG. 1. The visual dialog method includes the following steps:

Step 401: Acquire an image feature of an input image and state vectors corresponding to first n rounds of historical question answering dialog, n being a positive integer.

Schematically, the input image is an image in an existing image set. The visual dialog model includes a feature extraction model. The feature extraction model is a model constructed based on a convolutional neural network (CNN). For example, the image feature in the input image is extracted by using a fast region-CNN (fast R-CNN), as shown in Formula (2) below:

$$v = \text{FastR-CNN}(I) \qquad (2),$$

where v represents the image feature of the input image, I represents the input image, and FastR-CNN( ) represents processing corresponding to the Fast R-CNN.

Figure 5:
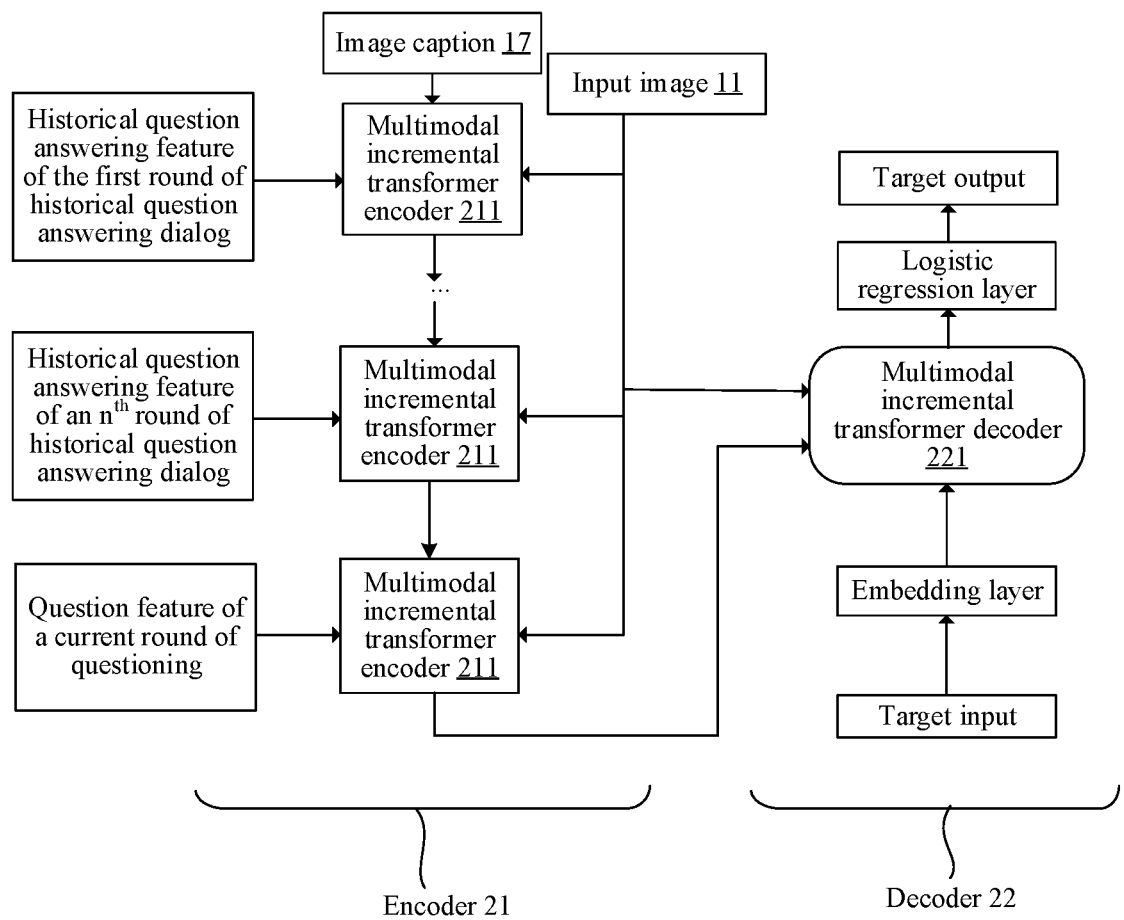
FIG. 5 is a structural framework diagram of a visual dialog model according to another exemplary embodiment of this application.

As shown in FIG. 5, an encoder 21 of the visual dialog model includes a plurality of MITEs 211. Each round of historical question answering dialog corresponds to one MITE 211. A state vector corresponding to a previous round of historical question answering dialog is used as an input for a MITE 211 corresponding to a next round of historical question answering dialog. This process is repeated until a state vector corresponding to a previous round of historical question answering dialog of current round of questioning is acquired. Different from FIG. 3, an input of the MITE 211 further includes an image caption 17.

In some embodiments of this application, the input image further corresponds to an image caption. The image caption is used for describing a relationship between entities in the input image. The image caption is also used as an input of the MITE 211 to allow the visual dialog model to better extract implicit information in the input image. For example, the input image 11 corresponds to an image caption: a road trip of four people.

Step 402: Acquire a question feature of a current round of questioning related to the input image.

Schematically, the feature extraction model is further configured to extract the question feature from the current round of questioning. The question feature $u_{n+1}$ is extracted by using the following Formula (3) and Formula (4):

$$u_{n+1} = [u_{n+1,1}, u_{n+1,2}, \ldots, u_{n+1,L}] \in R^{L \times M} \qquad (3), \text{ and}$$

$$u_{n+1,t} = w_{n+1,t} + PE(l) \qquad (4),$$

where PE( ) is processing corresponding to an absolute position encoding function, and $w_{n+1,t}$ is a word vector after a word embedding operation is performed on an $l^{th}$ character string in the current round of questioning. $u_{n+1,t}$ represents a character string feature of the $l^{th}$ character string in the current round of questioning. L represents a maximum quantity of character strings in the current round of questioning, M represents a dimensionality represented by each character string, and R represents a domain.

It may be understood that the foregoing absolute position encoding function may be replaced with a relative position encoding function.

In some embodiments of this application, the historical question answering features corresponding to the n rounds of historical question answering dialog may also be obtained by using the foregoing Formula (3) and Formula (4).

Step 403: Acquire a state vector corresponding to an $i^{th}$ round of historical question answering dialog, i being a positive integer, an initial value of i being 1.

In the embodiments of this application, the server first encodes a state vector corresponding to the first round of historical question answering dialog by using the first MITE 211; and then performs multimodal encoding on the image feature, the state vector corresponding to the first round of historical question answering dialog, and the question feature by using the second MITE 211, to obtain a state vector corresponding to the second round of historical question answering dialog. If the second round is not the current round, the server continues with the foregoing processing to obtain a state vector corresponding to the third round of historical question answering dialog. In this way, iteration is performed until the current round is reached to obtain a state vector corresponding to an $(n+1)^{th}$ round of historical question answering dialog. The multimodal incremental transformer encoders correspond one to one to historical question answering dialog. Therefore, when i is 1, the state vector corresponding to the $i^{th}$ round of historical question answering dialog is obtained by encoding the image feature and the question feature by the first MITE 211. When i is greater than 1, the state vector corresponding to the $i^{th}$ round of historical question answering dialog is obtained by encoding the image feature, the question feature, and a state vector corresponding to an $(i-1)^{th}$ historical question answering dialog by an $(i-1)^{th}$ MITE 211. i is a variable, and the value of i is any one of 1 to n.

The current round of questioning is considered as an $(n+1)^{th}$ round. As shown in FIG. 5, the state vector corresponding to the $(n+1)^{th}$ round of historical question answering dialog is outputted by the MITE 211 corresponding to the $(n+1)^{th}$ round of historical question answering dialog. Each round of historical question answering dialog corresponds to one MITE 211. The current round of questioning also corresponds to one MITE 211. The embodiments of this application are described by using an example in which there is at least one round of historical question answering dialog.

Step 404: Iterate i, and perform multimodal encoding on the image feature, the state vector corresponding to the $i^{th}$ round of historical question answering dialog, and a question answering feature corresponding to an $(i+1)^{th}$ round of historical question answering dialog by invoking an $(i+1)^{th}$ multimodal incremental transformer encoder in a visual dialog model, to obtain a state vector corresponding to the $(i+1)^{th}$ round of historical question answering dialog.

Schematically, in response to that the $(i+1)^{th}$ round is the current round of questioning, the server outputs a state vector corresponding to the current round of questioning by using the MITE 211 corresponding to the $(i+1)^{th}$ round of historical question answering dialog. In response to that the $(i+1)^{th}$ round is not the current round of questioning, the server outputs a state vector corresponding to the $(i+1)^{th}$ round of historical question answering dialog by using the MITE 211 corresponding to the $(i+1)^{th}$ round of historical question answering dialog. The state vector corresponding to the $(i+1)^{th}$ round of historical question answering dialog is used as an input of an $(i+2)^{th}$ round of historical question answering dialog.

In the embodiments of this application, the multimodal incremental transformer encoder includes K sub-transformer encoders, K being a positive integer. Step 404 may be replaced with the following steps:

Step 4041: Acquire a $i^{th}$ intermediate representation vector, the $i^{th}$ intermediate representation vector being obtained by performing multimodal encoding on the image feature, the state vector corresponding to the $i^{th}$ round of historical question answering dialog, and the question answering feature corresponding to the $(i+1)^{th}$ round of historical question answering dialog j times, the $j^{th}$ intermediate representation vector being a vector corresponding to the $(i+1)^{th}$ round of historical question answering dialog, j being a positive integer, an initial value of j being 1.

j is a variable, and the value of i is any one of 1 to K. When j is 1, the first sub-transformer encoder is invoked to perform multimodal encoding on the image feature, the state vector corresponding to the $i^{th}$ round of historical question answering dialog, and the question answering feature corresponding to the $(i+1)^{th}$ round of historical question answering dialog, to obtain the first intermediate encoding vector (a $j^{th}$ intermediate representation vector). When j is greater than 1, the first sub-transformer encoder is invoked to perform multimodal encoding on the image feature, the state vector corresponding to the $i^{th}$ round of historical question answering dialog, and a $(j-1)^{th}$ intermediate representation vector, to obtain a $i^{th}$ intermediate encoding vector (a $j^{th}$ intermediate representation vector).

Figure 6:
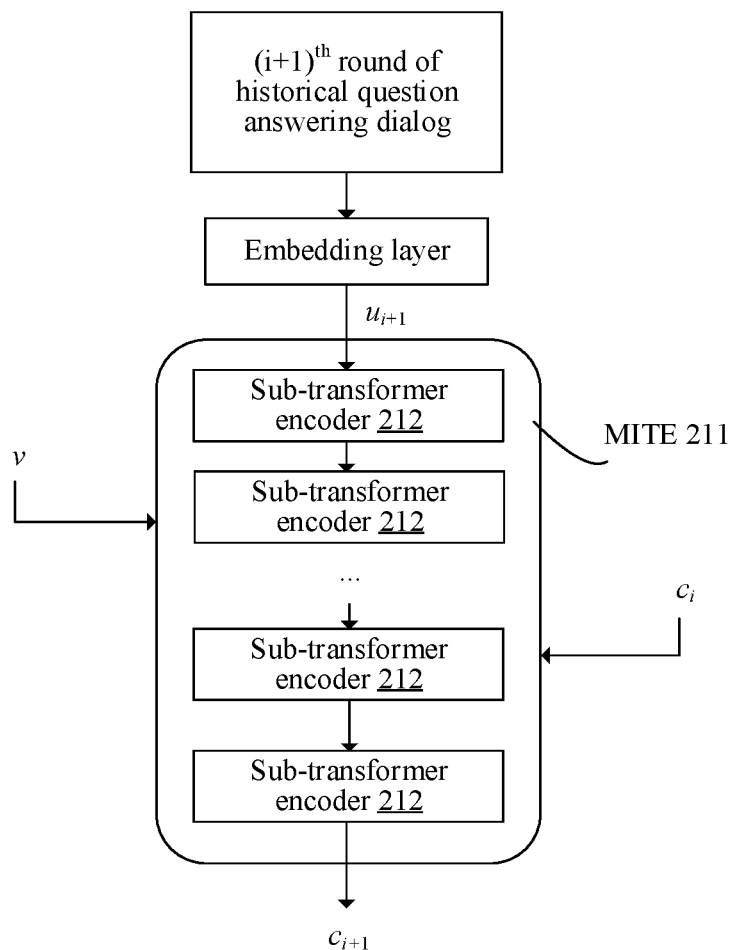
FIG. 6 is a structural framework diagram of a multimodal incremental transformer encoder according to an exemplary embodiment of this application.

As shown in FIG. 6, each MITE 211 includes K sub-transformer encoders 212, K being a positive integer. Each sub-transformer encoder 212 is configured to perform multimodal encoding once, so that multimodal encoding is performed K times in one round of historical question answering dialog. In one round of historical question answering dialog, for example, multimodal encoding is performed K times on the question answering feature $u_{i+1}$ (an output result obtained by after the $(i+1)^{th}$ round of historical question answering dialog passes through the embedding layer) corresponding to the $(i+1)^{th}$ round of historical question answering dialog, to obtain the state vector $c_{i+1}$ corresponding to the $(i+1)^{th}$ round of historical question answering dialog.

In the embodiments of this application, each MITE 211 includes the same quantity or different quantities of sub-transformer encoders. That is, multimodal encoding is performed the same quantity of times or different quantities of times in different rounds of historical question answering dialog.

In response to that the $(i+1)^{th}$ round is a non-current round of questioning, as shown in FIG. 6, an image feature v, a state vector $c_i$ corresponding to the $i^{th}$ round of historical question answering dialog, and the historical question answering feature $u_{i+1}$ (obtained after the $(i+1)^{th}$ round of historical question answering dialog passes through the embedding layer) are inputted into the first sub-transformer encoder 212 in an $(i+1)^{th}$ MITE 211 to output an intermediate representation vector. The intermediate representation vector, the image feature v, and a question answering feature $u_{i+1}$ corresponding to the round of historical question answering dialog are inputted into the second sub-transformer encoder 212. This process is repeated. A $j^{th}$ sub-transformer encoder 212 outputs a $j^{th}$ intermediate representation vector. The $j^{th}$ intermediate representation vector is a vector corresponding to the $(i+1)^{th}$ round of historical question answering dialog. The processing continues with the sub-transformer encoder 212, until an intermediate representation vector outputted by a $K^{th}$ sub-transformer encoder 212 is obtained. The intermediate representation vector outputted by the $K^{th}$ sub-transformer encoder 212 is a state vector $c_{i+1}$ corresponding to the $(i+1)^{th}$ round of historical question answering dialog.

In response to that the $(i+1)^{th}$ round is the current round of questioning, the image feature v, the state vector $c_i$ corresponding to the $i^{th}$ round of historical question answering dialog, and the question feature $u_{i+1}$ of the current round of questioning are inputted into the first sub-transformer encoder 212 in the $(i+1)^{th}$ MITE 211, to output an intermediate representation vector. The intermediate representation vector, the image feature v, and the historical question answering feature $u_{i+1}$ are inputted into the second sub-transformer encoder 212. This process is repeated. A $i^{th}$ sub-transformer encoder 212 outputs a $j^{th}$ intermediate representation vector. The $j^{th}$ intermediate representation vector is a vector corresponding to the current round of questioning (a state vector corresponding to a non-current round of questioning).

Step 4042: Iterate j, and perform multimodal encoding on the $j^{th}$ intermediate representation vector, the image feature, and the state vector corresponding to the $i^{th}$ round of historical question answering dialog by invoking a $(j+1)^{th}$ sub-transformer encoder in the $(i+1)^{th}$ multimodal incremental transformer encoder, to obtain a $(j+1)^{th}$ intermediate representation vector, the $(j+1)^{th}$ intermediate representation vector being another vector corresponding to the $(i+1)^{th}$ round of historical question answering dialog, $j+1 \leq K$.

In the embodiments of this application, the server inputs the image feature, a historical question answering feature of the $(i+1)^{th}$ round of historical question answering dialog, and the $j^{th}$ intermediate representation vector outputted by the $j^{th}$ sub-transformer encoder 212 into a $(j+1)^{th}$ sub-transformer encoder 212. The $(j+1)^{th}$ sub-transformer encoder outputs a $(j+1)^{th}$ intermediate representation vector. The $(j+1)^{th}$ intermediate representation vector is also a vector corresponding to the $(i+1)^{th}$ round of historical question answering dialog.

If $j+1<K$, the $(j+1)^{th}$ intermediate representation vector outputted by the $(j+1)^{th}$ sub-transformer encoder is used as an input of a $(j+2)^{th}$ sub-transformer encoder. If $j+1=K$, the $(j+1)^{th}$ intermediate representation vector outputted by the $(j+1)^{th}$ sub-transformer encoder is a state vector corresponding to the $(i+1)^{th}$ round of historical question answering dialog.

Step 4043: Determine a $K^{th}$ intermediate representation vector obtained by iterating j as the state vector corresponding to the $(i+1)^{th}$ round of historical question answering dialog.

In the embodiments of this application, the server inputs an intermediate representation vector outputted by a previous sub-transformer encoder into a next sub-transformer encoder, until K sub-transformer encoders in MITEs corresponding to one round of question answering dialog (including one round of historical question answering dialog and the current round of questioning) have all performed multimodal encoding, to output the state vector corresponding to one round of question answering dialog.

The server invokes the first sub-transformer encoder in the $(i+1)^{th}$ MITE to perform multimodal encoding on the image feature, the state vector corresponding to the $i^{th}$ round of historical question answering dialog, and the question answering feature of the $(i+1)^{th}$ round of historical question answering dialog, to obtain the $j^{th}$ intermediate representation vector; iterates j, and invokes the $(j+1)^{th}$ round sub-transformer encoder to perform multimodal encoding on the image feature, the state vector corresponding to the $(i+1)^{th}$ round of historical question answering dialog, and the $j^{th}$ intermediate representation vector, to obtain a $(j+1)^{th}$ intermediate representation vector, j being a positive integer variable incrementing from 1; and determines a $K^{th}$ intermediate representation vector obtained by iterating j as the state vector corresponding to the $(i+1)^{th}$ round of historical question answering dialog.

Step 405: Determine a state vector corresponding to an $(n+1)^{th}$ round of historical question answering dialog obtained by iterating i as the state vector corresponding to the current round of questioning.

Each round of historical question answering dialog corresponds to one MITE 211. Each MITE 211 outputs a state vector corresponding to each round of historical question answering dialog. A state vector outputted by a previous MITE 211 is used as an input of a next MITE 211, until an input reaches a MITE 211 corresponding to an $(n+1)^{th}$ round of questioning. The server outputs the state vector corresponding to the current round of questioning by using the MITE 211 corresponding to the $(n+1)^{th}$ round of questioning.

In the embodiments of this application, the server performs multimodal encoding on the image feature and a question answering feature corresponding to the first round of historical question answering dialog by invoking the first MITE in the visual dialog model, to obtain a state vector corresponding to the first round of historical question answering dialog; iterates i, and performs multimodal encoding on the image feature, the state vector corresponding to the $(i+1)^{th}$ round of historical question answering dialog, and a question answering feature corresponding to the $(i+1)^{th}$ round of historical question answering dialog by invoking the $(i+1)^{th}$ MITE, to obtain a state vector corresponding to an $(i+2)^{th}$ round of historical question answering dialog, i being a positive integer variable incrementing from 1; and determining a state vector corresponding to an $(n+1)^{th}$ round of historical question answering dialog obtained by iterating i as the state vector corresponding to the current round of questioning.

Step 406: Acquire a character string feature of an outputted character string in an actual output answer corresponding to the current round of questioning by invoking a multimodal incremental transformer decoder in the visual dialog model.

As shown in FIG. 5, the visual dialog model includes a multimodal incremental transformer decoder (MITD model) 221 configured to decode character strings forming an answer. Schematically, the current round of questioning is: "How are you?", and the actual output answer is: "I am OK". The MITD 221 is outputting a character string "OK", words "I" and "am" are inputted into the multimodal incremental transformer decoder.

In the embodiments of this application, the character string feature may be extracted from an answer text corresponding to an outputted answer by using the feature extraction model.

Step 407: Perform multimodal decoding on the state vector corresponding to the current round of questioning, the image feature, and the character string feature by invoking the multimodal incremental transformer decoder, to obtain a decoded feature vector.

Step 408: Determine the actual output answer corresponding to the current round of questioning according to the decoded feature vector, the actual output answer including the outputted character string.

In the embodiments of this application, the server inputs an outputted character string into the MITD 221, and outputs a character string in the actual output answer corresponding to the current round of questioning by combining the state vector corresponding to the current round of questioning and the image feature.

In the embodiments of this application, the multimodal incremental transformer decoder includes T sub-transformer encoders, T being a positive integer. The foregoing step 407 may be replaced with the following steps:

Step 4071: Acquire an $m^{th}$ intermediate representation vector, the $m^{th}$ intermediate representation vector being obtained by performing multimodal decoding on the state vector corresponding to the current round of questioning, the image feature, and the character string feature m times, m being a positive integer, an initial value of m being 1.

m is a variable, and the value of i is any one of 1 to T. When m is 1, multimodal decoding is performed on the state vector corresponding to the current round of questioning, the image feature, and the character string feature by invoking the first sub-transformer decoder, to obtain the first intermediate decoding vector (an $m^{th}$ intermediate representation vector). When m is greater than 1, multimodal decoding is performed on the state vector corresponding to the current round of questioning, the image feature, and an $(m-1)^{th}$ intermediate decoding vector (an $(m-1)^{th}$ intermediate representation vector) by invoking an $m^{th}$ sub-transformer decoder, to obtain an $m^{th}$ intermediate decoding vector (an $m^{th}$ intermediate representation vector).

As shown in FIG. 5, the MITD 221 in FIG. 5 includes T sub-transformer decoders 222. Each sub-transformer decoder 222 is configured to perform multimodal decoding once, so that one MITD 221 performs multimodal decoding on an inputted vector T times.

In some embodiments of this application, the visual dialog model includes one or more MITDs 221. The embodiments of this application are described by using an example in which the visual dialog model includes one MITD 221.

The image feature v, the character string feature, and the state vector $c_{n+1}$ corresponding to the current round of questioning outputted by the MITE 211 corresponding to the current round of questioning are inputted into the first sub-transformer decoder 222 in the MITD, to output an intermediate representation vector. The intermediate representation vector, the image feature v, and the character string feature are inputted into the second sub-transformer decoder 222. This process is repeated. An $m^{th}$ sub-transformer decoder 222 outputs an $m^{th}$ intermediate representation vector. The $m^{th}$ intermediate representation vector is a vector corresponding to the current round of questioning.

Step 4072: Iterate m, and perform multimodal decoding on the $m^{th}$ intermediate representation vector, the image feature, and the state vector corresponding to the current round of questioning by invoking an $(m+1)^{th}$ sub-transformer decoder in the multimodal incremental transformer decoder, to obtain an $(m+1)^{th}$ intermediate representation vector, m+1≤T.

In the embodiments of this application, the server inputs the $m^{th}$ intermediate representation vector outputted by the $m^{th}$ sub-transformer decoder into an $(m+1)^{th}$ sub-transformer decoder 222. The $(m+1)^{th}$ sub-transformer decoder outputs an $(m+1)^{th}$ intermediate representation vector. The $(m+1)^{th}$ intermediate representation vector is also a vector corresponding to the current round of questioning.

If m+1<T, the $(m+1)^{th}$ intermediate representation vector outputted by the $(m+1)^{th}$ sub-transformer decoder is used as an input of an $(m+2)^{th}$ sub-transformer decoder. If m+1=T, the $(m+1)^{th}$ intermediate representation vector outputted by the $(m+1)^{th}$ sub-transformer decoder is a decoded feature vector corresponding to the current round of questioning, and an outputted character string may be determined according to the decoded feature vector.

Step 4073: Determine a $T^{th}$ intermediate representation vector obtained by iterating m as the decoded feature vector.

In the embodiments of this application, the server inputs an intermediate representation vector outputted by a previous sub-transformer decoder into a next sub-transformer decoder, and outputs the decoded feature vector corresponding to the current round of questioning until the T sub-transformer decoders in the MITD have all performed multimodal decoding. The decoded feature vector is used for determining the actual output answer.

The server performs multimodal decoding on the image feature, the state vector corresponding to the current round of questioning, and the character string feature by invoking the first sub-transformer decoder in the MITD, to obtain the first intermediate decoding vector; iterates m, and performs multimodal encoding on the image feature, the state vector corresponding to the current round of questioning, and the $m^{th}$ intermediate decoding vector (the $m^{th}$ intermediate representation vector) by invoking the $(m+1)^{th}$ round sub-transformer decoder, to obtain an $(m+1)^{th}$ intermediate decoding vector (an $(m+1)^{th}$ intermediate representation vector), m being a positive integer variable incrementing from 1; and determines a $T^{th}$ intermediate decoding vector (a $T^{th}$ intermediate representation vector) obtained by iterating m as the decoded feature vector.

It may be understood that in the visual dialog method provided in the embodiments of this application, state vectors corresponding to first n rounds of historical question answering dialog about an input image are acquired, so that the visual dialog model can consider the context to better understand implicit information in an input image. A multimodal encoding mode and a multimodal decoding mode are used, so that the visual dialog model can better output an actual output answer corresponding to a current round of questioning according to various types of information, thereby improving the accuracy of an answer outputted by the visual dialog model, and ensuring the consistency of an output answer with a question and an input image to improve the effect of visual dialog.

It may further be understood that the server performs multimodal encoding on a state vector corresponding to each round of historical question answering dialog by using a multimodal incremental transformer encoder in the visual dialog model, and repeats the process, to obtain a state vector corresponding to the current round of questioning, so that a subsequent output answer obtained after multimodal decoding is more accurate.

It may further be understood that the server arranges K sub-transformer encoders in each multimodal incremental transformer encoder. Among the K sub-transformer encoders, an intermediate representation vector outputted by a previous sub-transformer encoder is sequentially transferred to a next sub-transformer encoder, to obtain a state vector corresponding to the current round of questioning, so that a subsequent output answer obtained after decoding is more accurate. In the embodiments of this application, through a layered structure, an accurate intermediate representation vector can be provided for a subsequent output answer.

It may further be understood that the server decodes a state vector outputted by a multimodal incremental transformer encoder by using a multimodal incremental transformer decoder in a visual dialog model, so that the visual dialog model can accurately output an actual output answer corresponding to a current round of questioning.

It may further be understood that the server arranges T sub-transformer decoders in the multimodal incremental transformer decoder. Among the T sub-transformer decoders, an intermediate representation vector outputted by a previous sub-transformer decoder is sequentially transferred to a next sub-transformer decoder, to obtain an actual output answer corresponding to the current round of questioning. In the embodiments of this application, through a layered structure, the accuracy of an answer outputted by the visual dialog model can be ensured.

The internal structure of the sub-transformer encoder and the internal structure of the sub-transformer decoder are respectively described below.

Figure 7:
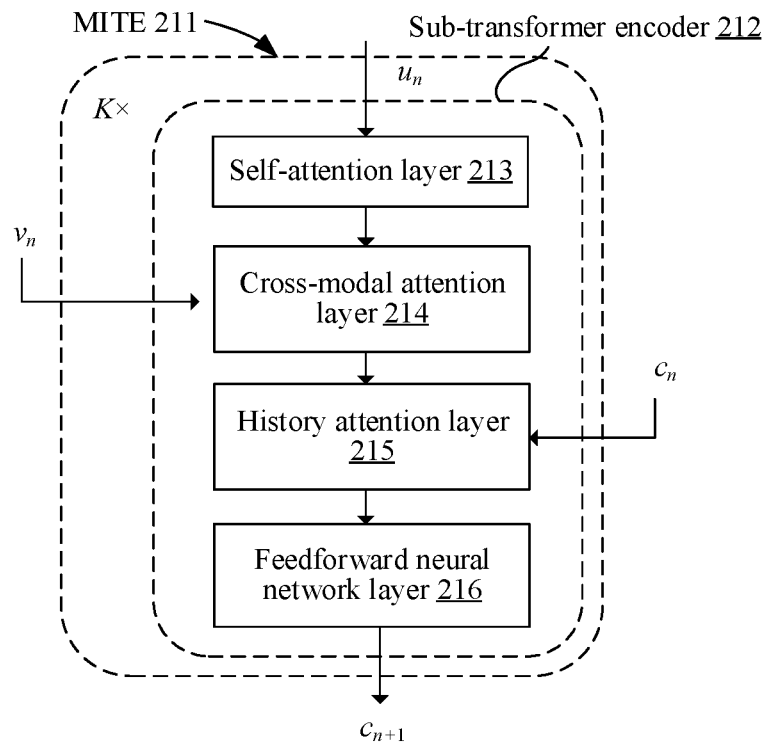
FIG. 7 is a structural framework diagram of a multimodal incremental transformer encoder according to another exemplary embodiment of this application.

FIG. 7 is a schematic structural diagram of a sub-transformer encoder according to an exemplary embodiment of this application. One sub-transformer encoder 212 includes a self-attention layer 213, a cross-modal attention layer 214, a history attention layer 215, and a feedforward neural network (FNN) layer 216. K represents that one MITE 211 includes K sub-transformer encoders 212, that is, includes K self-attention layers 213, K cross-modal attention layers 214, K history attention layers 215, and K FNN layers 216.

Schematically, an input and output process of a $(j+1)^{th}$ sub-transformer encoder is used as an example for description. The input and output process of the sub-transformer encoder is as follows:

Step 1: Perform intermediate encoding on the $j^{th}$ intermediate representation vector by invoking the $(j+1)^{th}$ sub-transformer encoder in the $(i+1)^{th}$ multimodal incremental transformer encoder, to obtain a first subvector.

In the embodiments of this application, the server inputs a $j^{th}$ intermediate representation vector outputted by a $j^{th}$ sub-transformer encoder into the self-attention layer 213 of a $(j+1)^{th}$ sub-transformer encoder, to output a first subvector.

Exemplarily, a process of acquiring the $j^{th}$ subvector may be implemented by using Formula (5). Formula (5) is as follows:

$$A^{(j+1)}=\text{MultiHead}(C^j,C^j,C^j) \quad (5),$$

where $A^{(j+1)}$ represents the first subvector, $C^j$ represents a $j^{th}$ intermediate representation vector outputted by a previous sub-transformer encoder (a $j^{th}$ sub-transformer encoder), and MultiHead( ) represents processing corresponding to a multihead attention mechanism.

It may be understood that the $j^{th}$ intermediate representation vector outputted by the $j^{th}$ sub-transformer encoder is outputted by the FNN layer of the $j^{th}$ sub-transformer encoder.

Step 2: Perform intermediate encoding on the first subvector and the image feature, to obtain a second subvector.

In the embodiments of this application, the server inputs the first subvector into the cross-modal attention layer 214, and simultaneously inputs the image feature v of the input image, to output a second subvector.

Exemplarily, a process of acquiring the second subvector may be implemented by using Formula (6). Formula (6) is as follows:

$$B^{(j+1)}=\text{MultiHead}(A^{(j+1)},v,v) \quad (6),$$

where $B^{(j+1)}$ represents the second subvector.

Step 3: Perform intermediate encoding on the second subvector and the state vector corresponding to the $i^{th}$ round of historical question answering dialog, to obtain a third subvector.

In the embodiments of this application, the server inputs the second subvector into the history attention layer 215, and simultaneously inputs a state vector (that is, a state vector outputted by a MITE corresponding to an $i^{th}$ round of historical question answering dialog) corresponding to an $i^{th}$ round of historical question answering dialog, to output a third subvector.

Exemplarily, a process of acquiring the third subvector may be implemented by using Formula (7). Formula (7) is as follows:

$$F^{(j+1)}=\text{MultiHead}(B^{(j+1)},c_i,c_i) \quad (7),$$

where $F^{(j+1)}$ represents the third subvector, and $c_i$ represents the state vector corresponding to the $i^{th}$ round of historical question answering dialog.

Step 4: Perform intermediate encoding on the third subvector, to obtain the $(j+1)^{th}$ intermediate representation vector.

In the embodiments of this application, the server inputs the third subvector into the FNN layer 216, and outputs the $(j+1)^{th}$ intermediate representation vector corresponding to the $(j+1)^{th}$ sub-transformer encoder.

Exemplarily, a process of acquiring the second intermediate representation vector may be implemented by using Formula (8). Formula (8) is as follows:

$$C^{(j+1)}=\text{FFN}(F^{(j+1)}) \quad (8),$$

where $C^{(j+1)}$ represents the $(j+1)^{th}$ intermediate representation vector, and FFN( ) represents processing corresponding to the FNN layer.

If the $(j+1)^{th}$ sub-transformer encoder is the last sub-transformer encoder (that is, j+1=K) in the MITE of the $(i+1)^{th}$ historical question answering dialog, the state vector corresponding to the $(i+1)^{th}$ historical question answering dialog is outputted.

Exemplarily, a process of acquiring the state vector corresponding to the $(i+1)^{th}$ historical question answering dialog may be implemented by using Formula (9). Formula (9) is as follows:

$$c_{i+1}=C^{(j+1)} \quad (9),$$

where $c_{i+1}$ represents the state vector corresponding to the $(i+1)^{th}$ round of historical question answering dialog.

If the $(j+1)^{th}$ sub-transformer encoder is not the last sub-transformer encoder (that is, j+1<K) in the MITE model, the intermediate representation vector is outputted. The intermediate representation vector is used as an input of a $(j+2)^{th}$ sub-transformer encoder. This process is repeated until the last sub-transformer encoder outputs the state vector corresponding to the $(i+1)^{th}$ round of historical question answering dialog.

Each MITE corresponds to one round of historical question answering dialog. The MITE corresponding to the current round of questioning inputs a state vector corresponding to a previous round of historical question answering dialog, a question feature, and an image feature into the self-attention layer 213 of the first sub-transformer encoder 212 in the MITE 211 corresponding to the current round of questioning. The foregoing process is repeated until the state vector corresponding to the current round of questioning is outputted.

It may be understood that in the visual dialog method according to the embodiments of this application, a multilayer structure is arranged in a sub-transformer encoder to separately calculate intermediate representation vectors, so that each sub-transformer encoder can accurately output an intermediate representation vector according to a previous sub-transformer encoder, thereby ensuring that a subsequent state vector corresponding to the current round of questioning is accurate.

Figure 8:
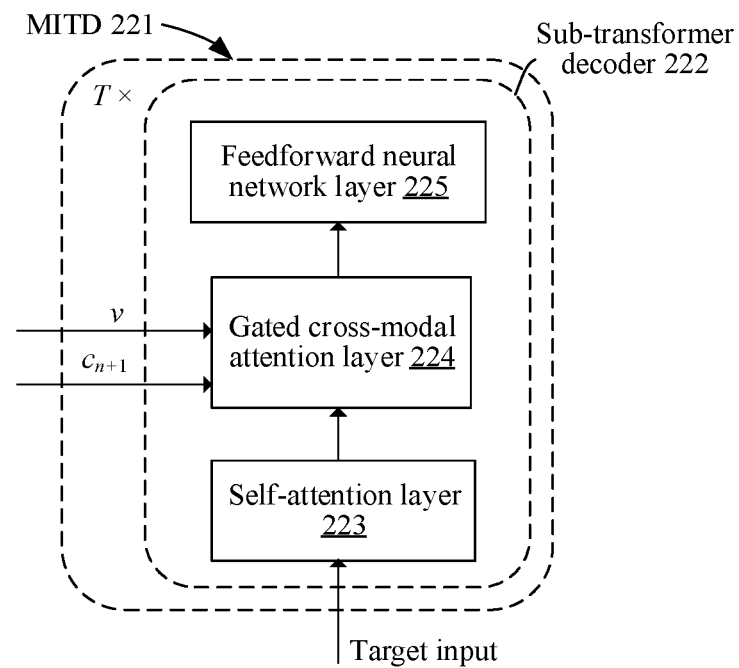
FIG. 8 is a structural framework diagram of a multimodal incremental transformer decoder according to an exemplary embodiment of this application.

FIG. 8 is a schematic structural diagram of a sub-transformer decoder according to an exemplary embodiment of this application. One sub-transformer decoder 222 includes a self-attention layer 223, a gated cross attention (GCA) layer 224, and an FNN layer 225. T represents that one MITD 221 includes T sub-transformer decoders 222, that is, includes T self-attention layers 223, T GCA layer layers 224, and T FNN layers 225. Inputs of one sub-transformer decoder 222 include an image feature v of the input image, a state vector corresponding to an $(n+1)^{th}$ round of historical question answering dialog, a question feature corresponding to the $(n+1)^{th}$ round, and a target input.

Schematically, an input and output process of an $(m+1)^{th}$ sub-transformer decoder is used as an example for description. The input and output process of the sub-transformer decoder is as follows:

Step 11: Perform intermediate decoding on the $m^{th}$ intermediate representation vector by invoking the $(m+1)^{th}$ sub-transformer decoder in the multimodal incremental transformer decoder, to obtain the third subvector.

In the embodiments of this application, the server inputs an $m^{th}$ intermediate representation vector outputted by an $m^{th}$ sub-transformer decoder into the self-attention layer 223 of an $(m+1)^{th}$ sub-transformer decoder, to output a third subvector.

Exemplarily, a process of acquiring the third subvector may be implemented by using Formula (10). Formula (10) is as follows:

$$J^{(m+1)}=\text{MultiHead}(R^m,R^m,R^m) \quad (10),$$

where $J^{(m+1)}$ represents the third subvector, $R^m$ represents an $m^{th}$ intermediate representation vector outputted by a previous sub-transformer decoder (an $m^{th}$ sub-transformer decoder), and MultiHead( ) represents a multihead attention mechanism.

No output of a sub-transformer decoder is provided as an input of the first sub-transformer decoder. A target input $R^0$ is inputted into the first sub-transformer decoder (that is, an answer feature of an actual output answer; during actual use of the visual dialog model, the target input is character string features of outputted first x character strings; and during training of the visual dialog model, the target input is character string features of character strings in the actual output answer corresponding to the outputted first x character strings).

It may be understood that the $m^{th}$ intermediate representation vector outputted by the $m^{th}$ sub-transformer decoder is outputted by the FNN layer of the $m^{th}$ sub-transformer decoder.

Step 12: Perform intermediate decoding on the third subvector, the image feature, and the state vector corresponding to the current round of questioning, to obtain a fourth subvector.

In the embodiments of this application, the server inputs the third subvector, the image feature, and the state vector corresponding to the current round of questioning into the GCA layer 224, to output a fourth subvector.

Figure 9:
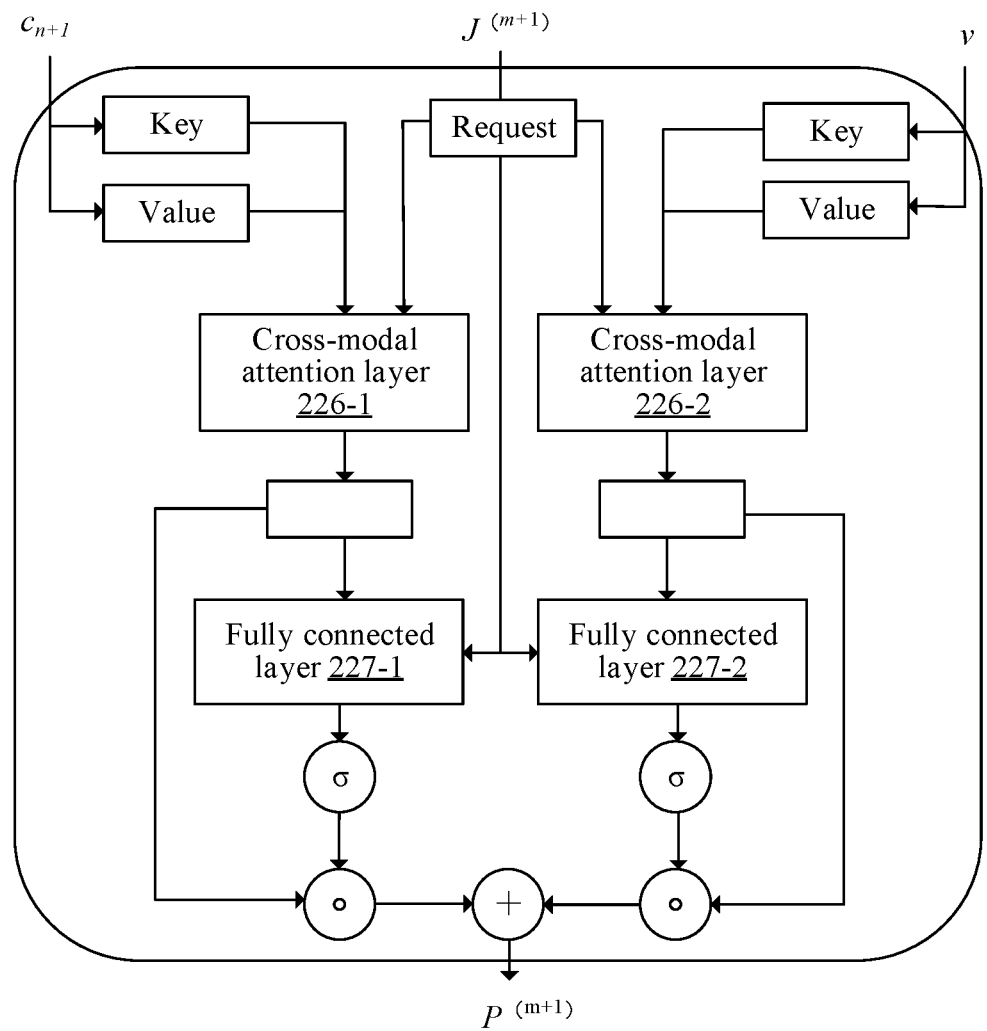
FIG. 9 is a structural framework diagram of a multimodal incremental transformer decoder according to another exemplary embodiment of this application.

As shown in FIG. 9, in the GCA layer 224, a cross-modal attention layer 226-1 receives a state vector $c_{n+1}$ corresponding to a current round (an $(n+1)^{th}$ round) of questioning, and outputs a vector $E^{(m+1)}$ according to the third subvector $J^{(m+1)}$ and the state vector $c_{n+1}$ corresponding to the current round of questioning, as shown in Formula (11):

$$E^{(m+1)}=\text{MultiHead}(J^{(m+1)},c_{n+1},c_{n+1}) \quad (11).$$

Continuing to refer to FIG. 9, a cross-modal attention layer 226-2 receives the image feature v, to output a vector $G^{(m+1)}$, as shown in Formula (12):

$$G^{(m+1)}=\text{MultiHead}(J^{(m+1)},v,v) \quad (12).$$

The cross-modal attention layer 226-1 and the cross-modal attention layer 226-2 in FIG. 9 are the same. Therefore, calculation processes on two sides are interchangeable. That is, the cross-modal attention layer 226-1 on the left side outputs the vector $G^{(m+1)}$, and the cross-modal attention layer 226-2 outputs the vector $E^{(m+1)}$. Unlabeled rectangles in FIG. 9 represent outputted vectors ($E^{(m+1)}$ and $G^{(m+1)}$). The rectangles are only used for representation but do not represent the sizes and quantity of actual outputted feature vectors.

Continuing to refer to FIG. 9, the vector $E^{(m+1)}$ outputted by the cross-modal attention layer 226-1 passes through a Fully Connected Layer (FCC) layer 227-1 to output a vector $\alpha^{(m+1)}$ as shown in Formula (13):

$$\alpha^{(m+1)}=\sigma(W_E[J^{(m+1)},E^{(m+1)}]+b_E) \quad (13),$$

where $E^{(m+1)}$ represents the vector outputted by the cross-modal attention layer 226-1, σ represents a logistic regression function (Sigmoid), and $W_E$ and $b_E$ represent parameters of the cross-modal attention layer 226-1.

Continuing to refer to FIG. 9, the vector $G^{(m+1)}$ outputted by the cross-modal attention layer 226-2 passes through an FCC layer 227-2 to output a vector $\beta^{(m+1)}$, as shown in Formula (14):

$$\beta^{(m+1)}=\sigma(w_G[J^{(m+1)},G^{(m+1)}]+b_G) \quad (14),$$

where $G^{(m+1)}$ represents the vector outputted by the cross-modal attention layer 226-2, 6 represents a logistic regression function (Sigmoid), and $W_G$ and $b_G$ represent parameters of the cross-modal attention layer 226-2.

Finally, the fourth subvector $P^{(m+1)}$ is calculated and outputted in combination with the foregoing calculation result by using Hadamard product, as shown in Formula (15):

$$P^{(m+1)}=\alpha^{(m+1)}oE^{(m+1)}+\beta^{(m+1)}oG^{(m+1)} \quad (15),$$

where o represents the Hadamard product.

The FCC layer 227-1 and the FCC layer 227-2 are the same. Therefore, calculation processes on two sides are interchangeable. That is, the FCC layer 227-2 outputs the vector $\alpha^{(m+1)}$, and the FCC layer 227-1 outputs the vector $\beta^{(m+1)}$.

Step 13: Perform intermediate decoding on the fourth subvector, to obtain the $(m+1)^{th}$ intermediate representation vector.

In the embodiments of this application, the server inputs the fourth subvector into the FNN layer 225, and outputs an $(m+1)^{th}$ intermediate representation vector corresponding to an $(m+1)^{th}$ time of multimodal decoding, as shown in Formula (16):

$$R^{(m+1)}=\text{FFN}(P^{(m+1)}) \quad (16),$$

where $R^{(m+1)}$ represents the $(m+1)^{th}$ intermediate representation vector outputted by the $(m+1)^{th}$ sub-transformer decoder.

If the $(m+1)^{th}$ sub-transformer decoder is the last sub-transformer decoder in the MITD, multimodal decoding is performed on the state vector corresponding to the current round of questioning, the image feature, and the character string feature, to obtain a decoded feature vector $r_{n+1}$, as shown in Formula (17):

$$r_{n+1}=R^{(m+1)} \quad (17).$$

If the $(m+1)^{th}$ sub-transformer decoder is not the last sub-transformer decoder in the MITD model, an intermediate representation vector is outputted. The intermediate representation vector is used as an input of an $(m+2)^{th}$ sub-transformer decoder. This process is repeated, until the last sub-transformer decoder outputs the foregoing decoded feature vector $r_{n+1}$.

In the embodiments of this application, the server obtains the character string probability outputted in the actual output answer according to the decoded feature vector.

As shown in FIG. 5, the feature vector outputted by the MITD is inputted into the logistic regression layer, to obtain a probability of a character string currently being outputted, as shown in Formula (18):

$$\widetilde{a_{n+1}}=\text{softmax}(r_{n+1}) \quad (18),$$

where $\widetilde{a_{n+1}}$ represents the probability of the character string currently being outputted (the character string probability).

In the embodiments of this application, the server outputs a character string in the actual output answer according to the character string probability. The server may determine, by using the outputted character string probability through the visual dialog model, the character string currently being outputted (a target output).

It may be understood that in the visual dialog method according to the embodiments of this application, a multi-layer structure is arranged in a sub-transformer decoder to separately calculate intermediate representation vectors, so that each sub-transformer decoder can accurately output an intermediate representation vector according to a previous sub-transformer decoder, thereby ensuring that a subsequent decoded feature vector corresponding to the current round of questioning is accurate, to ensure the accuracy of the actual output answer outputted according to the decoded feature vector.

It may be understood that the attention model in the multimodal incremental transformer encoder and the multimodal incremental transformer decoder in the embodiments of this application may be replaced with another attention model such as a conventional attention model, a local attention model, a global attention model, a multimodal attention model.

The method for training a visual dialog model is described below.

Figure 10:
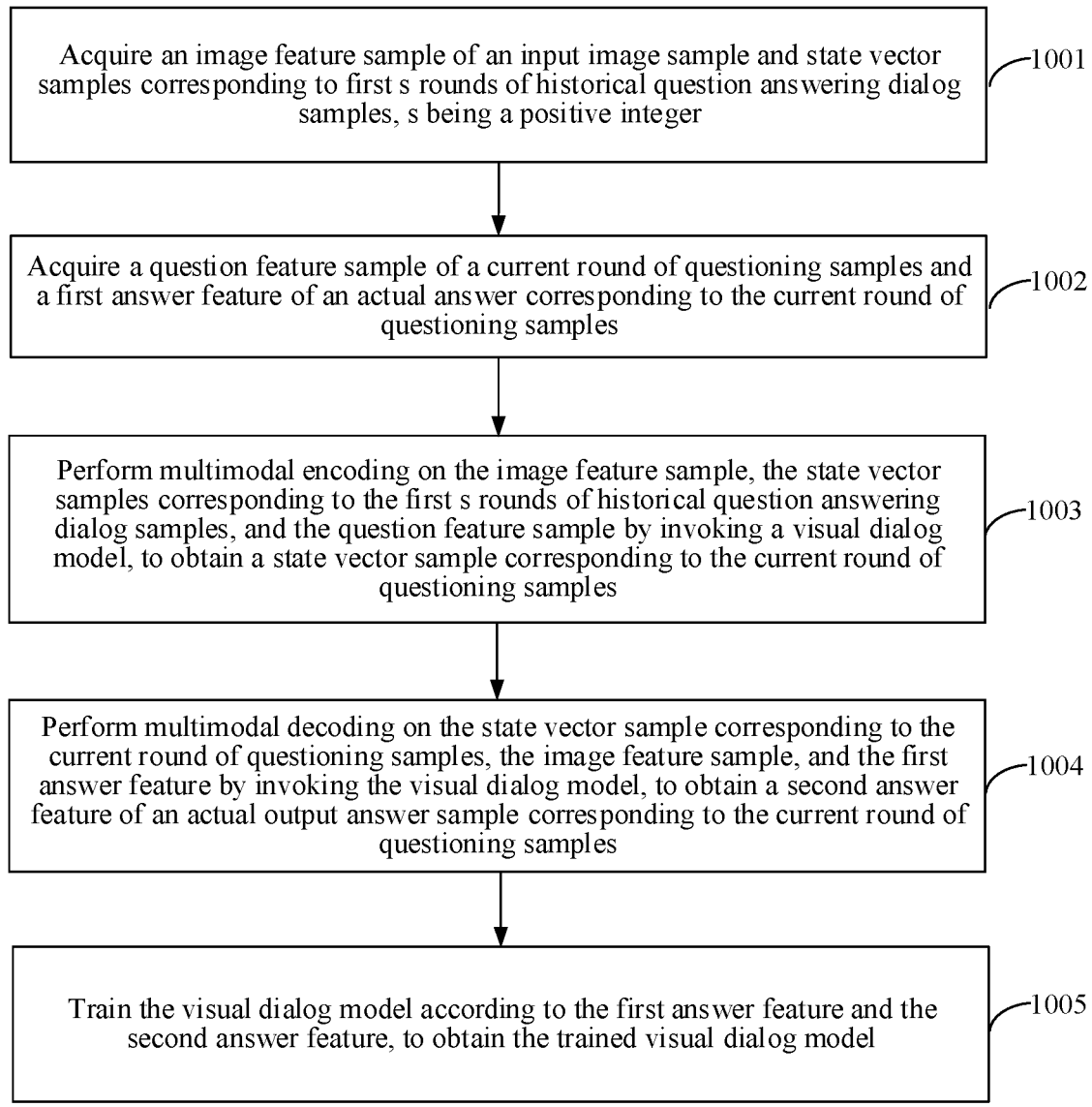
FIG. 10 is a flowchart of a method for training a visual dialog model according to an exemplary embodiment of this application.

FIG. 10 is a flowchart of a method for training a visual dialog model according to an exemplary embodiment of this application. The embodiments of this application are described by using an example in which the visual dialog method is applied to the server 120 in the visual dialog system 100 shown in FIG. 1. The visual dialog method includes the following steps:

Step 1001: Acquire an image feature sample of an input image sample and state vector samples corresponding to first s rounds of historical question answering dialog samples, s being a positive integer.

A training sample for training a visual dialog model includes an input image sample. The input image sample is an image in an existing image set. The visual dialog model includes a feature extraction model. The feature extraction model is a model constructed based on a CNN. The server extracts a feature in the input image sample by using a fast region-CNN, and the extracted feature is an image feature sample. Alternatively, the server extracts an image feature sample in the input image sample by using a CNN. Alternatively, the server extracts an image feature sample in the input image sample by using a visual geometry group (VGG) network. Alternatively, the server extracts an image feature sample in the input image sample by using a residual neural network (ResNET). The process of training the visual dialog model includes a process of training the feature extraction model, so that the feature extraction model is a trained feature extraction model.

The implementation description corresponding to step 1001 is similar to that of step 401.

Step 1002: Acquire a question feature sample of a current round of questioning samples and a first answer feature of an actual answer corresponding to the current round of questioning samples.

In the embodiments of this application, the server may acquire a question feature and a first answer feature by using Formulas (3) and (4). The question feature and the first answer feature may be obtained by using the visual dialog model.

Step 1003: Perform multimodal encoding on the image feature sample, the state vector samples corresponding to the first s rounds of historical question answering dialog samples, and the question feature sample by invoking a visual dialog model, to obtain a state vector sample corresponding to the current round of questioning samples.

In the embodiments of this application, the server arranges s multimodal incremental transformer encoders (MITEs) for first s rounds of historical question answering dialog samples by using the visual dialog model and arranges a corresponding MITE for a current round of questioning samples. State vector samples corresponding to one round of historical question answering dialog samples outputted by a previous MITE are used as inputs of a next MITE. The foregoing process of outputting a state vector sample is repeated until a state vector sample corresponding to the current round of questioning samples is outputted.

Step 1004: Perform multimodal decoding on the state vector sample corresponding to the current round of questioning samples, the image feature sample, and the first answer feature by invoking the visual dialog model, to obtain a second answer feature of an actual output answer sample corresponding to the current round of questioning samples.

In the embodiments of this application, the visual dialog model further includes a multimodal incremental transformer decoder (MITD). The server inputs a state vector sample corresponding to the current round of questioning sample, the image feature sample, and the first answer feature into the MITD. The MITD model includes T sub-transformer decoders. An intermediate representation vector outputted by a previous sub-transformer decoder is used as an input of a next sub-transformer decoder. The foregoing process of outputting an intermediate representation vector is repeated until a final decoded feature vector sample corresponding to the current round of questioning samples is outputted. The decoded feature vector sample is a second answer feature of an actual output answer sample corresponding to the current round of questioning samples.

In a process of training the visual dialog model, the server acquires the character string feature label (the first answer feature) of the first q character strings in the actual answer by using the visual dialog model. The first q character strings in the actual answer correspond one to one to outputted q character strings in the actual output answer, q being a positive integer. The second answer feature corresponding a $(q+1)^{th}$ character string in the actual output answer is obtained according to the state vector sample corresponding to the current round of questioning samples, the image feature sample, and the character string feature label.

For example, the current round of questioning sample is: "How are you?", the actual answer of the current round of questioning sample is "I am fine.", and the actual output answer sample of the visual dialog model is "I am OK.", in the process of training the visual dialog model, when the visual dialog model is about to output the third word (character string) in the actual output answer sample, words "I" and "am" in the actual answer are inputted into the MITD to obtain the state vector sample corresponding to the current round of questioning sample, so that the third word in the answer outputted by the visual dialog model is: OK (or good).

Step 1005: Train the visual dialog model according to the first answer feature and the second answer feature, to obtain the trained visual dialog model.

In the embodiments of this application, the server trains the visual dialog model according to a difference between the first answer feature and the second answer feature. The trained visual dialog model is the visual dialog model in step 403.

For example, the visual dialog model is trained by using the actual outputted word "OK" and the word "fine" in the actual answer.

It may be understood that in the visual dialog method in the embodiments of this application, state vectors corresponding to first n rounds of historical question answering dialog about an input image are acquired, so that the trained visual dialog model can consider the context to better understand implicit information in an image. A multimodal encoding mode and a multimodal decoding mode are used, so that the trained visual dialog model can better output an actual output answer corresponding to a current round of questioning according to various types of information, thereby improving the accuracy of an answer outputted by the trained visual dialog model, and ensuring the consistency of an output answer with a question and an input image to improve the effect of visual dialog.

It may further be understood that the visual dialog model is trained by using the state vector sample corresponding to the current round of questioning sample, the image feature sample, and the first answer feature corresponding to the actual answer, so that the accuracy of an answer outputted by the trained visual dialog model is improved.

In the embodiments of this application, when the trained visual dialog model is about to output the $(q+1)^{th}$ character string, the visual dialog model determines the $(q+1)^{th}$ character string to be outputted according to all character strings before the $(q+1)^{th}$ character string in the actual answer and the state vector sample corresponding to the current round of questioning samples, so that a character string outputted by the trained visual dialog model is more accurate, thereby ensuring the accuracy of an output answer is higher.

It may be understood that the method for training a visual dialog model is similar to a method for using a visual dialog model. During training of a visual dialog model, multimodal decoding is performed on a state vector sample corresponding to a current round of questioning samples and an image feature sample, to obtain a second answer feature of an actual output answer corresponding to the current round of questioning, and the visual dialog model is trained by using the first answer feature and the second answer feature of an actual answer. During actual use of the visual dialog model, after a question is inputted into the visual dialog model, the trained visual dialog model outputs a character string to be outputted according to the outputted character string and a state vector corresponding to the current round of questioning.

In the embodiments of this application, first state vector samples corresponding to an $a^{th}$ round of historical question answering dialog samples are acquired by invoking the multimodal incremental transformer encoder in the visual dialog model, a being a positive integer, a being a variable, a value corresponding to a being any one of 1 to s; a state vector sample corresponding to the $a^{th}$ round of historical question answering dialog sample is acquired, a being a positive integer, an initial value of a being 1; a is iterated, and multimodal encoding is performed on the image feature sample, the state vector sample corresponding to the $a^{th}$ round of historical question answering dialog samples, and a question answering feature sample corresponding to an $(a+1)^{th}$ round of historical question answering dialog samples by invoking an $(a+1)^{th}$ multimodal incremental transformer encoder in the visual dialog model, to obtain a state vector sample corresponding to the $(a+1)^{th}$ round of historical question answering dialog samples, multimodal incremental transformer encoders corresponding one to one to the historical question answering dialog samples; and a state vector sample corresponding to an $(s+1)^{th}$ round of historical question answering dialog samples obtained by iterating a is determined as the state vector sample corresponding to the current round of questioning samples.

In the embodiments of this application, the multimodal incremental transformer encoder includes K sub-transformer encoders, K being a positive integer; a $j^{th}$ intermediate representation vector sample is acquired, the $j^{th}$ intermediate representation vector sample being obtained by performing multimodal encoding on the image feature sample, the state vector sample corresponding to the $a^{th}$ round of historical question answering dialog samples, and the question answering feature sample corresponding to the $(a+1)^{th}$ round of historical question answering dialog sample j times, the $i^{th}$ intermediate representation vector sample being a vector corresponding to the $(a+1)^{th}$ round of historical question answering dialog sample, j being a positive integer, an initial value of j being 1; j is iterated, and multimodal encoding is performed on the $j^{th}$ intermediate representation vector sample, the image feature sample, and the state vector sample corresponding to the $i^{th}$ round of historical question answering dialog samples by invoking a $(j+1)^{th}$ sub-transformer encoder in the $(a+1)^{th}$ multimodal incremental transformer encoder in the visual dialog model, to obtain a $(j+1)^{th}$ intermediate representation vector sample, the $(j+1)^{th}$ intermediate representation vector sample being another vector corresponding to the $(i+1)^{th}$ round of historical question answering dialog samples, $j+1 \leq K$; and a $K^{th}$ intermediate representation vector sample obtained by iterating j is determined as the state vector sample corresponding to the $(a+1)^{th}$ round of historical question answering dialog sample.

In the embodiments of this application, intermediate encoding is performed on the $j^{th}$ intermediate representation vector sample by invoking the $(j+1)^{th}$ sub-transformer encoder sample in the $(a+1)^{th}$ multimodal incremental transformer encoder, to obtain a first subvector sample; intermediate encoding is performed on the first subvector sample and the image feature sample, to obtain a second subvector sample; intermediate encoding is performed on the second subvector sample and the state vector sample corresponding to the $a^{th}$ round of historical question answering dialog samples, to obtain a third subvector sample; and intermediate encoding is performed on the third subvector sample, to obtain the $(j+1)^{th}$ intermediate representation vector sample.

In the embodiments of this application, a character string feature sample of an outputted character string in an actual output answer sample corresponding to the current round of questioning samples is acquired by invoking a multimodal incremental transformer decoder in the visual dialog model; multimodal decoding is performed on the state vector sample corresponding to the current round of questioning samples, the image feature sample, and the character string feature sample by invoking the multimodal incremental transformer decoder, to obtain a decoded feature vector sample; and the actual output answer sample corresponding to the current round of questioning is determined according to the decoded feature vector sample.

In the embodiments of this application, the multimodal incremental transformer decoder includes T sub-transformer decoders, T being a positive integer; an $m^{th}$ intermediate representation vector sample is acquired, the $m^{th}$ intermediate representation vector sample being obtained by performing multimodal decoding on the state vector sample corresponding to the current round of questioning samples, the image feature sample, and the character string feature sample m times, m being a positive integer, an initial value of m being 1; m is iterated, and multimodal decoding is performed on the $m^{th}$ intermediate representation vector sample, the image feature sample, and the state vector sample corresponding to the current round of questioning samples by invoking an $(m+1)^{th}$ sub-transformer decoder in the multimodal incremental transformer decoder, to obtain an $(m+1)^{th}$ intermediate representation vector sample, $m+1 \leq T$; and a $T^{th}$ intermediate representation vector sample obtained by iterating m is determined as the decoded feature vector sample.

In the embodiments of this application, intermediate decoding is performed on the $m^{th}$ intermediate representation vector sample by invoking the $(m+1)^{th}$ sub-transformer decoder in the multimodal incremental transformer decoder, to obtain a third subvector sample; intermediate decoding is performed on the third subvector sample, the image feature sample, and the state vector sample corresponding to the current round of questioning samples, to obtain a fourth subvector sample; and intermediate decoding is performed on the fourth subvector sample, to obtain the $(m+1)^{th}$ intermediate representation vector sample.

In the embodiments of this application, a character string estimation probability outputted in the actual output answer sample is obtained according to the decoded feature vector sample. A character string sample in the actual output answer sample is outputted according to the character string estimation probability.

Table 1 shows training effects in comparison between a visual dialog model and a reference model. The visual dialog model provided in the foregoing embodiments is comprehensively estimated by using different types of evaluation indicators.

TABLE 1

| Evaluation indicator (Evaluation based on a public data set) | MRR | R@1 | R@5 | R@10 | Mean |
|---|---|---|---|---|---|
| Reference visual dialog model | 47.99 | 38.18 | 57.54 | 64.42 | 18.60 |
| Visual dialog model in this embodiment of this application | 50.68 | 40.43 | 60.57 | 68.03 | 15.78 |
| Comparison effect (the increased or decreased number of points) | 2.69 | 2.55 | 3.03 | 3.61 | 2.82 |

For each question, the visual dialog model acquires a list of candidate answers. Three evaluation indicators in Table 1 are used for evaluating the answer retrieval performance of the visual dialog model.

MRR represents a mean reciprocal rank. Sorting is performed in the list of candidate answers. If a correct answer is arranged at an $a^{th}$ position, the value of MRR is 1/a. When the value of MRR is larger, it indicates that an answer outputted by the visual dialog model is more accurate, that is, the visual dialog model has a better effect.

R@K represents the existence of the human response in top-K ranked responses. When the value of R@K is larger, it indicates that an answer outputted by the visual dialog model is more accurate, that is, the visual dialog model has a better effect.

Mean represents an average grade of the human response. When the value of Mean is smaller, it indicates that an answer outputted by the visual dialog model is more accurate, that is, the visual dialog model has a better effect.

As can be seen from FIG. 1, the visual dialog model provided in the embodiments of this application is better than the reference visual dialog model in all evaluation indicators (an increase or a decrease of one point is usually considered as a significant increase or decrease).

Figure 11:
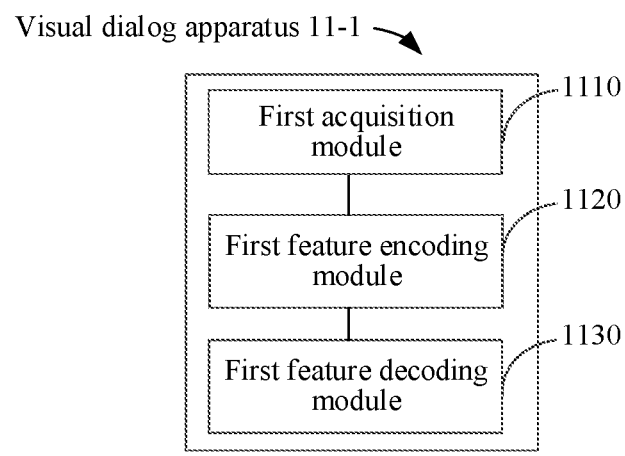
FIG. 11 is a structural block diagram of a visual dialog apparatus according to an exemplary embodiment of this application.

FIG. 11 is a structural block diagram of a visual dialog apparatus according to an exemplary embodiment of this application. A visual dialog apparatus 11-1 includes:

a first acquisition module 1110, configured to acquire an image feature of an input image and state vectors corresponding to first n rounds of historical question answering dialog, n being a positive integer, the first acquisition module 1110 being configured to acquire a question feature of a current round of questioning related to the input image;

a first feature encoding module 1120, configured to perform multimodal encoding on the image feature of the input image, the state vectors corresponding to the first n rounds of historical question answering dialog, and the question feature of the current round of questioning, to obtain a state vector corresponding to the current round of questioning; and a first feature decoding module 1130, configured to perform multimodal decoding on the state vector corresponding to the current round of questioning and the image feature of the input image, to obtain an actual output answer corresponding to the current round of questioning.

In the embodiments of this application, the first feature encoding module 1120 is further configured to: acquire a state vector corresponding to an $i^{th}$ round of historical question answering dialog, i being a positive integer, an initial value of i being 1; iterate i, and perform multimodal encoding on the image feature, the state vector corresponding to the $i^{th}$ round of historical question answering dialog, and a question answering feature corresponding to an $(i+1)^{th}$ round of historical question answering dialog by invoking an $(i+1)^{th}$ multimodal incremental transformer encoder in a visual dialog model, to obtain a state vector corresponding to the $(i+1)^{th}$ round of historical question answering dialog, different multimodal incremental transformer encoders corresponding one to one to different historical question answering dialog; and determine a state vector corresponding to an $(n+1)^{th}$ round of historical question answering dialog obtained by iterating i as the state vector corresponding to the current round of questioning.

In the embodiments of this application, the multimodal incremental transformer encoder includes K sub-transformer encoders, K being a positive integer; the first feature encoding module 1120 is further configured to: acquire a $j^{th}$ intermediate representation vector, the $j^{th}$ intermediate representation vector being obtained by performing multimodal encoding on the image feature, the state vector corresponding to the $i^{th}$ round of historical question answering dialog, and the question answering feature corresponding to the $(i+1)^{th}$ round of historical question answering dialog j times, the $j^{th}$ intermediate representation vector being a vector corresponding to the $(i+1)^{th}$ round of historical question answering dialog, j being a positive integer, an initial value of j being 1; iterate j, and perform multimodal encoding on the $j^{th}$ intermediate representation vector, the image feature, and the state vector corresponding to the $i^{th}$ round of historical question answering dialog by invoking a $(j+1)^{th}$ sub-transformer encoder in the $(i+1)^{th}$ multimodal incremental transformer encoder in the visual dialog model, to obtain a $(j+1)^{th}$ intermediate representation vector, the $(j+1)^{th}$ intermediate representation vector being another vector corresponding to the $(i+1)^{th}$ round of historical question answering dialog, $j+1 \leq K$; and determine a $K^{th}$ intermediate representation vector obtained by iterating j as the state vector corresponding to the $(i+i)^{th}$ round of historical question answering dialog.

In the embodiments of this application, the first feature encoding module 1120 is further configured to: perform intermediate encoding on the $j^{th}$ intermediate representation vector by invoking the $(j+1)^{th}$ sub-transformer encoder in the $(i+1)^{th}$ multimodal incremental transformer encoder, to obtain a first subvector; perform intermediate encoding on the first subvector and the image feature, to obtain a second subvector; perform intermediate encoding on the second subvector and the state vector corresponding to the $i^{th}$ round of historical question answering dialog, to obtain a third subvector; and perform intermediate encoding on the third subvector, to obtain the $(j+1)^{th}$ intermediate representation vector.

In the embodiments of this application, the first feature decoding module 1130 is further configured to: acquire a character string feature of an outputted character string in an actual output answer corresponding to the current round of questioning by invoking a multimodal incremental transformer decoder in the visual dialog model; perform multimodal decoding on the state vector corresponding to the current round of questioning, the image feature, and the character string feature by invoking the multimodal incremental transformer decoder, to obtain a decoded feature vector; determine the actual output answer corresponding to the current round of questioning according to the decoded feature vector, the actual output answer including the outputted character string.

In the embodiments of this application, the first feature decoding module 1130 is further configured to: determine a character string probability according to the decoded feature vector; and determine the character string in the actual output answer according to the character string probability.

In the embodiments of this application, the multimodal incremental transformer decoder includes T sub-transformer decoders, T being a positive integer; and the first feature decoding module 1130 is further configured to: acquire an $m^{th}$ intermediate representation vector, the $m^{th}$ intermediate representation vector being obtained by performing multimodal decoding on the state vector corresponding to the current round of questioning, the image feature, and the character string feature m times, m being a positive integer, an initial value of m being 1; iterate m, and perform multimodal decoding on the $m^{th}$ intermediate representation vector, the image feature, and the state vector corresponding to the current round of questioning by invoking an $(m+1)^{th}$ sub-transformer decoder in the multimodal incremental transformer decoder, to obtain an $(m+1)^{th}$ intermediate representation vector, $m+1 \leq T$; and determine a $T^{th}$ intermediate representation vector obtained by iterating m as the decoded feature vector.

In the embodiments of this application, the first feature decoding module 1130 is further configured to: perform intermediate decoding on the $m^{th}$ intermediate representation vector by invoking the $(m+1)^{th}$ sub-transformer decoder in the multimodal incremental transformer decoder, to obtain the third subvector; perform intermediate decoding on the third subvector, the image feature, and the state vector corresponding to the current round of questioning, to obtain a fourth subvector; and perform intermediate decoding on the fourth subvector, to obtain the $(m+1)^{th}$ intermediate representation vector.

It may be understood that for the visual dialog apparatus provided in the embodiments of this application, state vectors corresponding to first n rounds of historical question answering dialog about an input image are acquired, so that the visual dialog model can consider the context to better understand implicit information in an image. A multimodal encoding mode and a multimodal decoding mode are used, so that the visual dialog model can better output an actual output answer corresponding to a current round of questioning according to various types of information, thereby improving the accuracy of an answer outputted by the visual dialog model, and ensuring the consistency of an output answer with a question and an input image to improve the effect of visual dialog.

It may further be understood that multimodal encoding is performed on a state vector corresponding to each round of historical question answering dialog by using a multimodal incremental transformer encoder in the visual dialog model, and the process is repeated, to obtain a state vector corresponding to the current round of questioning, so that a subsequent output answer obtained after multimodal decoding is more accurate.

It may further be understood that K sub-transformer encoders are arranged in each multimodal incremental transformer encoder. Among the K sub-transformer encoders, an intermediate representation vector outputted by a previous sub-transformer encoder is sequentially transferred to a next sub-transformer encoder, to obtain a state vector corresponding to the current round of questioning, so that a subsequent output answer obtained after decoding is more accurate. Through a layered structure, it can be ensured that an accurate intermediate representation vector is provided for a subsequent output answer.

It may further be understood that a state vector outputted by a multimodal incremental transformer encoder is decoded by using a multimodal incremental transformer decoder in a visual dialog model, so that the visual dialog model can accurately output an actual output answer corresponding to a current round of questioning.

It may further be understood that T sub-transformer decoders are arranged in the multimodal incremental transformer decoder. Among the T sub-transformer decoders, an intermediate representation vector outputted by a previous sub-transformer decoder is sequentially transferred to a next sub-transformer decoder, to obtain an actual output answer corresponding to the current round of questioning. Through a layered structure, the accuracy of an answer outputted by the visual dialog model is ensured.

It may further be understood that a multi-layer structure is arranged in a sub-transformer encoder to separately calculate intermediate representation vectors, so that each sub-transformer encoder can accurately output an intermediate representation vector according to a previous sub-transformer encoder, thereby ensuring that a subsequent state vector corresponding to the current round of questioning is accurate.

In the visual dialog method according to the embodiments of this application, a multi-layer structure is arranged in a sub-transformer decoder to separately calculate intermediate representation vectors, so that each sub-transformer decoder can accurately output an intermediate representation vector according to a previous sub-transformer decoder, thereby ensuring that a subsequent decoded feature vector corresponding to the current round of questioning is accurate, to ensure that the actual output answer is outputted according to the decoded feature vector.

For the foregoing visual dialog apparatus provided in the embodiments of this application, only division of the foregoing functional modules is used as an example for description. In the practical application, the functions may be allocated to and completed by different functional modules according to requirements. That is, an internal structure of the device is divided into different functional modules, to complete all or some of the functions described above. In addition, the visual dialog apparatus provided in the foregoing embodiment belongs to the same conception as the embodiment of the visual dialog method. For a specific implementation process thereof, reference may be made to the visual dialog method provided in the embodiments of this application. Details are not described herein again.

Figure 12:
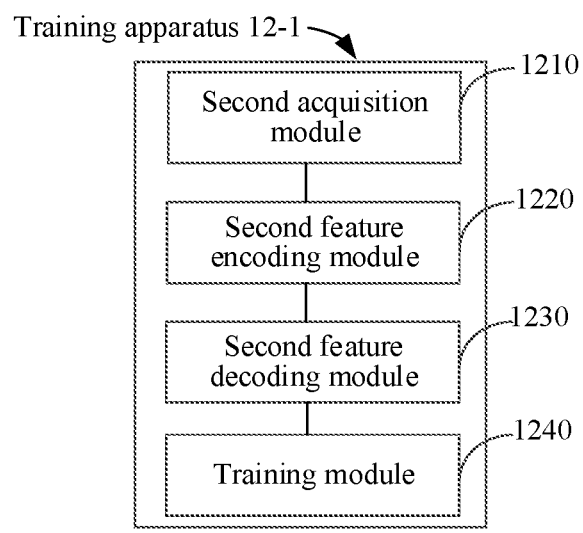
FIG. 12 is a structural block diagram of an apparatus for training a visual dialog model according to an exemplary embodiment of this application.

FIG. 12 is a structural block diagram of an apparatus for training a visual dialog model according to an exemplary embodiment of this application. A training apparatus 12-1 includes:

- a second acquisition module 1210, configured to acquire an image feature sample of an input image sample and state vector samples corresponding to first s rounds of historical question answering dialog samples, s being a positive integer,
- the second acquisition module 1210 being configured to acquire a question feature sample of a current round of questioning samples and a first answer feature of an actual answer corresponding to the current round of questioning samples;
- a second feature encoding module 1220, configured to perform multimodal encoding on the image feature sample, the state vector samples corresponding to the first s rounds of historical question answering dialog samples, and the question feature sample by invoking a visual dialog model, to obtain a state vector sample corresponding to the current round of questioning samples;
- a second feature decoding module 1230, configured to perform multimodal decoding on the state vector sample corresponding to the current round of questioning samples, the image feature sample, and the first answer feature by invoking the visual dialog model, to obtain a second answer feature of an actual output answer sample corresponding to the current round of questioning samples; and
- a training module 1240, configured to train the visual dialog model according to the first answer feature and the second answer feature, to obtain the trained visual dialog model.

In the embodiments of this application, the second feature decoding module 1230 is further configured to: acquire a character string feature label of first q character strings in the actual answer, the first q character strings in the actual answer corresponding one to one to outputted q character strings in the actual output answer sample, q being a positive integer, the first answer feature including the character string feature label; and obtain the second answer feature corresponding to a (q+1) character string in the actual output answer sample corresponding to the current round of questioning samples according to the state vector sample corresponding to the current round of questioning samples, the image feature sample, and the character string feature label.

In the embodiments of this application, the second feature encoding module 1220 is further configured to acquire first state vector samples corresponding to an $a^{th}$ round of historical question answering dialog samples by invoking the multimodal incremental transformer encoder in the visual dialog model, a being a positive integer, a being a variable, a value corresponding to a being any one of 1 to s; acquire a state vector sample corresponding to the $a^{th}$ round of historical question answering dialog sample, a being a positive integer, an initial value of a being 1; iterate a, and perform multimodal encoding on the image feature sample, the state vector sample corresponding to the $a^{th}$ round of historical question answering dialog samples, and a question answering feature sample corresponding to an $(a+1)^{th}$ round of historical question answering dialog samples by invoking an $(a+1)^{th}$ multimodal incremental transformer encoder in the visual dialog model, to obtain a state vector sample corresponding to the $(a+1)^{th}$ round of historical question answering dialog samples, different multimodal incremental transformer encoders corresponding one to one to different historical question answering dialog samples; and determine a state vector sample corresponding to an $(s+1)^{th}$ round of historical question answering dialog samples obtained by iterating a as the state vector sample corresponding to the current round of questioning samples.

In the embodiments of this application, the multimodal incremental transformer encoder includes K sub-transformer encoders, K being a positive integer; and the second feature encoding module 1220 is further configured to: acquire a $j^{th}$ intermediate representation vector sample, the $j^{th}$ intermediate representation vector sample being obtained by performing multimodal encoding on the image feature sample, the state vector sample corresponding to the $a^{th}$ round of historical question answering dialog samples, and the question answering feature sample corresponding to the $(a+1)^{th}$ round of historical question answering dialog sample j times, the $j^{th}$ intermediate representation vector sample being a vector corresponding to the $(a+1)^{th}$ round of historical question answering dialog sample, j being a positive integer, an initial value of j being 1; iterate j, and perform multimodal encoding on the $j^{th}$ intermediate representation vector sample, the image feature sample, and the state vector sample corresponding to the $i^{th}$ round of historical question answering dialog samples by invoking a $(j+1)^{th}$ sub-transformer encoder in the $(a+1)^{th}$ multimodal incremental transformer encoder in the visual dialog model, to obtain a $(j+1)^{th}$ intermediate representation vector sample, the $(j+1)^{th}$ intermediate representation vector sample being another vector corresponding to the $(i+1)^{th}$ round of historical question answering dialog samples, j+1≤K; and determine a $K^{th}$ intermediate representation vector sample obtained by iterating j as the state vector sample corresponding to the $(a+1)^{th}$ round of historical question answering dialog sample.

In the embodiments of this application, the second feature encoding module 1220 is further configured to: perform intermediate encoding on the $j^{th}$ intermediate representation vector sample by invoking the $(j+1)^{th}$ sub-transformer encoder sample in the $(a+1)^{th}$ multimodal incremental transformer encoder, to obtain a first subvector sample; perform intermediate encoding on the first subvector sample and the image feature sample, to obtain a second subvector sample; perform intermediate encoding on the second subvector sample and the state vector sample corresponding to the $a^{th}$ round of historical question answering dialog samples, to obtain a third subvector sample; and perform intermediate encoding on the third subvector sample, to obtain the $(j+1)^{th}$ intermediate representation vector sample.

In the embodiments of this application, the second feature decoding module 1230 is further configured to: acquire a character string feature sample of an outputted character string in an actual output answer sample corresponding to the current round of questioning samples by invoking a multimodal incremental transformer decoder in the visual dialog model; perform multimodal decoding on the state vector sample corresponding to the current round of questioning samples, the image feature sample, and the character string feature sample by invoking the multimodal incremental transformer decoder, to obtain a decoded feature vector sample; and determine the actual output answer sample corresponding to the current round of questioning according to the decoded feature vector sample.

In the embodiments of this application, the multimodal incremental transformer decoder includes T sub-transformer decoders, T being a positive integer; and the second feature decoding module 1230 is further configured to: acquire an $m^{th}$ intermediate representation vector sample, the $m^{th}$ intermediate representation vector sample being obtained by performing multimodal decoding on the state vector sample corresponding to the current round of questioning samples, the image feature sample, and the character string feature sample m times, m being a positive integer, an initial value of m being 1; iterate m, and perform multimodal decoding on the $m^{th}$ intermediate representation vector sample, the image feature sample, and the state vector sample corresponding to the current round of questioning samples by invoking an $(m+1)^{th}$ sub-transformer decoder in the multimodal incremental transformer decoder, to obtain an $(m+1)^{th}$ intermediate representation vector sample, $m+1 \le T$; and determine a $T^{th}$ intermediate representation vector sample obtained by iterating m as the decoded feature vector sample.

In the embodiments of this application, the second feature decoding module 1230 is further configured to: perform intermediate decoding on the $m^{th}$ intermediate representation vector sample by invoking the $(m+1)^{th}$ sub-transformer decoder in the multimodal incremental transformer decoder, to obtain a third subvector sample; perform intermediate decoding on the third subvector sample, the image feature sample, and the state vector sample corresponding to the current round of questioning samples, to obtain a fourth subvector sample; and perform intermediate decoding on the fourth subvector sample, to obtain the $(m+1)^{th}$ intermediate representation vector sample.

In the embodiments of this application, the second feature decoding module 1230 is further configured to: obtain a character string estimation probability outputted in the actual output answer sample according to the decoded feature vector sample; and output a character string sample in the actual output answer sample according to the character string estimation probability.

Figure 13:
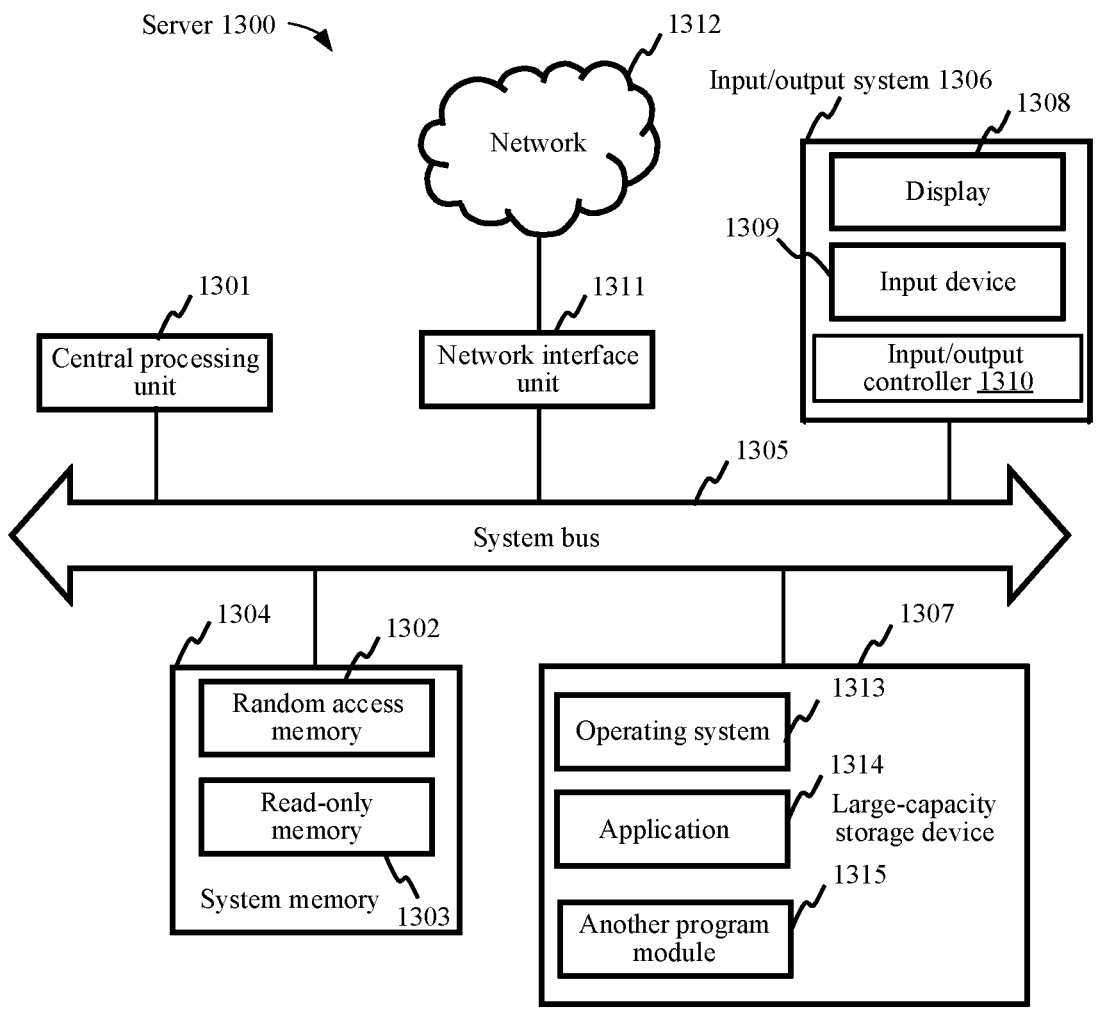
FIG. 13 is a schematic structural diagram of a server according to an exemplary embodiment of this application.

FIG. 13 is a schematic structural diagram of a server according to an exemplary embodiment of this application. A server 1300 may be the server 120 in the visual dialog system 100 shown in FIG. 1. As shown in FIG. 13, the server 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The server 1300 further includes a basic input/output (I/O) system 1306 assisting in transmitting information between components in the computer, and a mass storage device 1307 configured to store an operating system 1313, an application 1314, and another program module 1315.

The basic I/O system 1306 includes a display 1308 configured to display information and an input device 1309 such as a mouse or a keyboard that is used for inputting information by a user. The display 1308 and the input device 1309 are both connected to the CPU 1301 by using an input/output controller 1310 connected to the system bus 1305. The basic I/O system 1306 may further include the input and output controller 1310 to be configured to receive and process inputs from a plurality of other devices such as a keyboard, a mouse, and an electronic stylus. Similarly, the input/output controller 1310 further provides an output to a display screen, a printer, or another type of output device.

The mass storage device 1307 is connected to the CPU 1301 by using a mass storage controller (not shown in FIG. 13) connected to the system bus 1305. The mass storage device 1307 and a computer-readable medium associated with the large-capacity storage device provide non-volatile storage to the server 1300. That is, the mass storage device 1307 may include the computer-readable medium (not shown in FIG. 13) such as a hard disk or a Compact Disc Read-Only Memory (CD-ROM) drive.

The computer-readable storage medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or a solid state drive (SSD), another optical storage, a magnetic cassette, a magnetic tape, a magnetic disk memory, or another magnetic storage device. The RAM may include a resistance random access memory (ReRAM) and a dynamic random access memory (DRAM). Certainly, a person skilled in art can know that the computer storage medium is not limited to the foregoing several types. The system memory 1304 and the mass storage device 1307 may be collectively referred to as a memory.

In the embodiments of this application, the server 1300 may further be connected, through a network such as the Internet, to a remote computer on the network and run. That is, the server 1300 may be connected to a network 1312 by using a network interface unit 1311 connected to the system bus 1305, or may be connected to another type of network or a remote computer system (not shown in FIG. 13) by using a network interface unit 1311.

The memory further includes one or more programs. The one or more programs are stored in the memory and configured to be executed by the CPU.

In the embodiments of this application, an electronic device is provided, the electronic device including a processor and a memory, the memory storing at least one instruction, at least one program, a code set or an instruction set, the at least one instruction, the at least one program, the code set, or the instruction set being loaded or executed by the processor to implement the foregoing visual dialog method and method for training a visual dialog model.

In the embodiments of this application, a computer-readable storage medium is provided, the computer-readable storage medium storing at least one instruction, at least one program, a code set or an instruction set, the at least one instruction, the at least one program, the code set, or the instruction set being loaded or executed by a processor to implement the foregoing visual dialog method and method for training a visual dialog model.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

The embodiments of this application further provide a computer program product or a computer program. The computer program product or the computer program includes computer instructions, and the computer instructions are stored in a computer-readable storage medium. A processor of the electronic device reads the computer instructions from the computer-readable storage medium, and the computer instructions, when being executed by the processor, cause the electronic device to perform the visual dialog method and the method for training a visual dialog model in the foregoing aspects.

A person of ordinary skill in the art may understand that all or some of the steps implementing the methods in the foregoing embodiments of this application may be implemented by hardware or a program instructing relevant hardware. The program may be stored in a computer-readable storage medium. The above-mentioned computer-readable storage medium may be a read-only memory (ROM), a magnetic disk, an optical disk, or the like.

The foregoing descriptions are merely embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method performed by an electronic device acting as a server that is communicatively connected to a terminal, wherein the electronic device includes an input/output (I/O) system, a processor and a memory and a system bus connecting the I/O system, the processor and the memory together, the method comprising:
   receiving, via the I/O system, an input image submitted by the terminal;
   acquiring, from the memory, an image feature of the input image and state vectors corresponding to first n rounds of historical question answering dialog, n being a positive integer;
   acquiring, via the I/O system, a question feature of a current round of questioning related to the input image submitted by the terminal;
   performing, via the processor and using a visual dialog model stored in the memory, multimodal encoding on the image feature of the input image, the state vectors corresponding to the first n rounds of historical question answering dialog, and the question feature of the current round of questioning, to obtain a state vector corresponding to the current round of questioning, the performing further including acquiring a character string feature of an outputted character string corresponding to the current round of questioning by invoking a multimodal incremental transformer decoder in the visual dialog model;
   performing, via the processor and using the visual dialog model stored in the memory, multimodal decoding on the state vector corresponding to the current round of questioning and the image feature of the input image, and the character string feature by invoking the multimodal incremental transformer decoder in the visual dialog model, to obtain a decoded feature vector;
   determining, via the processor, an actual output answer corresponding to the current round of questioning according to the decoded feature vector, the actual output answer comprising the outputted character string; and
   returning, via the I/O system, the actual output answer corresponding to the current round of questioning to the terminal.

2. The method according to claim 1, wherein the performing, via the processor and using the visual dialog model stored in the memory, multimodal encoding on the image feature of the input image, the state vectors corresponding to the first n rounds of historical question answering dialog, and the question feature of the current round of questioning, to obtain a state vector corresponding to the current round of questioning comprises:
   acquiring a state vector corresponding to an $i^{th}$ round of historical question answering dialog, i being a positive integer, an initial value of i being 1;
   iterating i, and performing multimodal encoding on the image feature, the state vector corresponding to the $i^{th}$ round of historical question answering dialog, and a question answering feature corresponding to an $(i+1)^{th}$ round of historical question answering dialog by invoking an $(i+1)^{th}$ multimodal incremental transformer encoder in the visual dialog model, to obtain a state vector corresponding to the $(i+1)^{th}$ round of historical question answering dialog, different multimodal incremental transformer encoders corresponding one to one to different historical question answering dialog; and
   determining a state vector corresponding to an $(n+1)^{th}$ round of historical question answering dialog obtained by iterating i as the state vector corresponding to the current round of questioning.

3. The method according to claim 2, wherein the $(i+1)^{th}$ multimodal incremental transformer encoder comprises K sub-transformer encoders, K being a positive integer; and
   the performing multimodal encoding on the image feature, the state vector corresponding to the $i^{th}$ round of historical question answering dialog, and a question answering feature corresponding to an $(i+1)^{th}$ round of historical question answering dialog by invoking an $(i+1)^{th}$ multimodal incremental transformer encoder in the visual dialog model, to obtain a state vector corresponding to the $(i+1)^{th}$ round of historical question answering dialog comprises:
   acquiring a $j^{th}$ intermediate representation vector, the $j^{th}$ intermediate representation vector being obtained by performing multimodal encoding on the image feature, the state vector corresponding to the $i^{th}$ round of historical question answering dialog, and the question answering feature corresponding to the $(i+1)^{th}$ round of historical question answering dialog j times, the $j^{th}$ intermediate representation vector being a vector corresponding to the $(i+1)^{th}$ round of historical question answering dialog, j being a positive integer, an initial value of j being 1;
   iterating j, and performing multimodal encoding on the $j^{th}$ intermediate representation vector, the image feature, and the state vector corresponding to the $i^{th}$ round of historical question answering dialog by invoking a $(j+1)^{th}$ sub-transformer encoder in the $(i+1)^{th}$ multimodal incremental transformer encoder, to obtain a $(j+1)^{th}$ intermediate representation vector, the $(j+1)^{th}$ intermediate representation vector being another vector corresponding to the $(i+1)^{th}$ round of historical question answering dialog, $j+1 \le K$; and
   determining a $K^{th}$ intermediate representation vector obtained by iterating j as the state vector corresponding to the $(i+1)^{th}$ round of historical question answering dialog.

4. The method according to claim 3, wherein the performing multimodal encoding on the $j^{th}$ intermediate representation vector, the image feature, and the state vector corresponding to the $i^{th}$ round of historical question answering dialog by invoking a $(j+1)^{th}$ sub-transformer encoder in the $(i+1)^{th}$ multimodal incremental transformer encoder, to obtain a $(j+1)^{th}$ intermediate representation vector comprises:

performing intermediate encoding on the $j^{th}$ intermediate representation vector by invoking the $(j+1)^{th}$ sub-transformer encoder in the $(i+1)^{th}$ multimodal incremental transformer encoder, to obtain a first subvector;

performing intermediate encoding on the first subvector and the image feature, to obtain a second subvector;

performing intermediate encoding on the second subvector and the state vector corresponding to the $i^{th}$ round of historical question answering dialog, to obtain a third subvector; and performing intermediate encoding on the third subvector, to obtain the $(j+1)^{th}$ intermediate representation vector.

5. The method according to claim 1, wherein the determining, via the processor, the actual output answer corresponding to the current round of questioning according to the decoded feature vector comprises:

determining a character string probability according to the decoded feature vector; and determining the character string in the actual output answer according to the character string probability.

6. The method according to claim 1, wherein the multimodal incremental transformer decoder comprises T sub-transformer decoders, T being a positive integer; and the performing, via the processor and using the visual dialog model stored in the memory, multimodal decoding on the state vector corresponding to the current round of questioning, the image feature, and the character string feature by invoking the multimodal incremental transformer decoder, to obtain a decoded feature vector comprises:

acquiring an $m^{th}$ intermediate representation vector, the $m^{th}$ intermediate representation vector being obtained by performing multimodal decoding on the state vector corresponding to the current round of questioning, the image feature, and the character string feature m times, m being a positive integer, an initial value of m being 1;

iterating m, and performing multimodal decoding on the $m^{th}$ intermediate representation vector, the image feature, and the state vector corresponding to the current round of questioning by invoking an $(m+1)^{th}$ sub-transformer decoder in the multimodal incremental transformer decoder, to obtain an $(m+1)^{th}$ intermediate representation vector, $m+1 \leq T$; and determining a $T^{th}$ intermediate representation vector obtained by iterating m as the decoded feature vector.

7. The method according to claim 5, wherein the performing multimodal decoding on the $m^{th}$ intermediate representation vector, the image feature, and the state vector corresponding to the current round of questioning by invoking an $(m+1)^{th}$ sub-transformer decoder in the multimodal incremental transformer decoder, to obtain an $(m+1)^{th}$ intermediate representation vector comprises:

performing intermediate decoding on the $m^{th}$ intermediate representation vector by invoking the $(m+1)^{th}$ sub-transformer decoder in the multimodal incremental transformer decoder, to obtain the third subvector;

performing intermediate decoding on the third subvector, the image feature, and the state vector corresponding to the current round of questioning, to obtain a fourth subvector; and performing intermediate decoding on the fourth subvector, to obtain the $(m+1)^{th}$ intermediate representation vector.

8. The method according to claim 6, wherein the visual dialog model is trained by:

acquiring an image feature sample of an input image sample and state vector samples corresponding to first s rounds of historical question answering dialog samples, s being a positive integer;

acquiring a question feature sample of a current round of questioning samples and a first answer feature of an actual answer corresponding to the current round of questioning samples;

performing multimodal encoding on the image feature sample, the state vector samples corresponding to the first s rounds of historical question answering dialog samples, and the question feature sample by invoking the visual dialog model, to obtain a state vector sample corresponding to the current round of questioning samples; and performing multimodal decoding on the state vector sample corresponding to the current round of questioning samples, the image feature sample, and the first answer feature by invoking the visual dialog model, to obtain a second answer feature of an actual output answer sample corresponding to the current round of questioning samples; and training the visual dialog model according to the first answer feature and the second answer feature, to obtain the trained visual dialog model.

9. The method according to claim 8, wherein the performing multimodal decoding on the state vector sample corresponding to the current round of questioning samples, the image feature sample, and the first answer feature, to obtain a second answer feature of an actual output answer sample corresponding to the current round of questioning samples comprises:

acquiring a character string feature label of first q character strings in the actual answer, the first q character strings in the actual answer corresponding one to one to outputted q character strings in the actual output answer sample, q being a positive integer, the first answer feature comprising the character string feature label; and obtaining the second answer feature corresponding to a (q+1) character string in the actual output answer sample corresponding to the current round of questioning samples according to the state vector sample corresponding to the current round of questioning samples, the image feature sample, and the character string feature label.

10. An electronic device acting as a server that is communicatively connected to a terminal, the electronic device comprising an input/output (I/O) system, a processor and a memory and a system bus connecting the I/O system, the processor and the memory together, the memory storing at least one instruction, the at least one instruction being executed by the processor and causing the electronic device to implement a method including:

receiving, via the I/O system, an input image submitted by the terminal;

acquiring, from the memory, an image feature of the input image and state vectors corresponding to first n rounds of historical question answering dialog, n being a positive integer;

acquiring, via the I/O system, a question feature of a current round of questioning related to the input image submitted by the terminal;

performing, via the processor and using a visual dialog model stored in the memory, multimodal encoding on the image feature of the input image, the state vectors corresponding to the first n rounds of historical question answering dialog, and the question feature of the current round of questioning, to obtain a state vector corresponding to the current round of questioning, the performing further including acquiring a character string feature of an outputted character string corresponding to the current round of questioning by invoking a multimodal incremental transformer decoder in the visual dialog model;

performing, via the processor and using the visual dialog model stored in the memory, multimodal decoding on the state vector corresponding to the current round of questioning and the image feature of the input image, and the character string feature by invoking the multimodal incremental transformer decoder in the visual dialog model, to obtain a decoded feature vector;

determining, via the processor, an actual output answer corresponding to the current round of questioning according to the decoded feature vector, the actual output answer comprising the outputted character string; and returning, via the I/O system, the actual output answer corresponding to the current round of questioning to the terminal.

11. The electronic device according to claim 10, wherein the performing, via the processor and using the visual dialog model stored in the memory, multimodal encoding on the image feature of the input image, the state vectors corresponding to the first n rounds of historical question answering dialog, and the question feature of the current round of questioning, to obtain a state vector corresponding to the current round of questioning comprises:

acquiring a state vector corresponding to an $i^{th}$ round of historical question answering dialog, i being a positive integer, an initial value of i being 1;

iterating i, and performing multimodal encoding on the image feature, the state vector corresponding to the $i^{th}$ round of historical question answering dialog, and a question answering feature corresponding to an $(i+1)^{th}$ round of historical question answering dialog by invoking an $(i+1)^{th}$ multimodal incremental transformer encoder in the visual dialog model, to obtain a state vector corresponding to the $(i+1)^{th}$ round of historical question answering dialog, different multimodal incremental transformer encoders corresponding one to one to different historical question answering dialog; and determining a state vector corresponding to an $(n+1)^{th}$ round of historical question answering dialog obtained by iterating i as the state vector corresponding to the current round of questioning.

12. The electronic device according to claim 10, wherein the determining, via the processor, the actual output answer corresponding to the current round of questioning according to the decoded feature vector comprises:

determining a character string probability according to the decoded feature vector; and determining the character string in the actual output answer according to the character string probability.

13. A non-transitory computer-readable storage medium, storing at least one instruction, the at least one instruction being executed by a processor of an electronic device acting as a server that is communicatively connected to a terminal, wherein the electronic device includes an input/output (I/O) system, a processor and a memory and a system bus connecting the I/O system, the processor and the memory together, and the at least one instruction causing the electronic device to perform a method including:

receiving, via the I/O system, an input image submitted by the terminal;

acquiring, from the memory, an image feature of the input image and state vectors corresponding to first n rounds of historical question answering dialog, n being a positive integer;

acquiring, via the I/O system, a question feature of a current round of questioning related to the input image submitted by the terminal;

performing, via the processor and using a visual dialog model stored in the memory, multimodal encoding on the image feature of the input image, the state vectors corresponding to the first n rounds of historical question answering dialog, and the question feature of the current round of questioning, to obtain a state vector corresponding to the current round of questioning, the performing further including acquiring a character string feature of an outputted character string corresponding to the current round of questioning by invoking a multimodal incremental transformer decoder in the visual dialog model;

performing, via the processor and using the visual dialog model stored in the memory, multimodal decoding on the state vector corresponding to the current round of questioning and the image feature of the input image, and the character string feature by invoking the multimodal incremental transformer decoder in the visual dialog model, to obtain a decoded feature vector;

determining, via the processor, an actual output answer corresponding to the current round of questioning according to the decoded feature vector, the actual output answer comprising the outputted character string; and returning, via the I/O system, the actual output answer corresponding to the current round of questioning to the terminal.

14. The non-transitory computer-readable storage medium according to claim 13, wherein the performing, via the processor and using the visual dialog model stored in the memory, multimodal encoding on the image feature of the input image, the state vectors corresponding to the first n rounds of historical question answering dialog, and the question feature of the current round of questioning, to obtain a state vector corresponding to the current round of questioning comprises:

acquiring a state vector corresponding to an $i^{th}$ round of historical question answering dialog, i being a positive integer, an initial value of i being 1;

iterating i, and performing multimodal encoding on the image feature, the state vector corresponding to the $i^{th}$ round of historical question answering dialog, and a question answering feature corresponding to an $(i+1)^{th}$ round of historical question answering dialog by invoking an $(i+1)^{th}$ multimodal incremental transformer encoder in the visual dialog model, to obtain a state vector corresponding to the $(i+1)^{th}$ round of historical question answering dialog, different multimodal incremental transformer encoders corresponding one to one to different historical question answering dialog; and determining a state vector corresponding to an $(n+1)^{th}$ round of historical question answering dialog obtained by iterating i as the state vector corresponding to the current round of questioning.

15. The non-transitory computer-readable storage medium according to claim 13, wherein the determining, via the processor, the actual output answer corresponding to the current round of questioning according to the decoded feature vector comprises:

determining a character string probability according to the decoded feature vector; and determining the character string in the actual output answer according to the character string probability.

16. The electronic device according to claim 11, wherein the $(i+1)^{th}$ multimodal incremental transformer encoder comprises K sub-transformer encoders, K being a positive integer; and the performing multimodal encoding on the image feature, the state vector corresponding to the $i^{th}$ round of historical question answering dialog, and a question answering feature corresponding to an $(i+1)^{th}$ round of historical question answering dialog by invoking an $(i+1)^{th}$ multimodal incremental transformer encoder in the visual dialog model, to obtain a state vector corresponding to the $(i+1)^{th}$ round of historical question answering dialog comprises:

acquiring a $j^{th}$ intermediate representation vector, the $j^{th}$ intermediate representation vector being obtained by performing multimodal encoding on the image feature, the state vector corresponding to the $i^{th}$ round of historical question answering dialog, and the question answering feature corresponding to the $(i+1)^{th}$ round of historical question answering dialog j times, the $j^{th}$ intermediate representation vector being a vector corresponding to the $(i+1)^{th}$ round of historical question answering dialog, j being a positive integer, an initial value of j being 1;

iterating j, and performing multimodal encoding on the $j^{th}$ intermediate representation vector, the image feature, and the state vector corresponding to the $i^{th}$ round of historical question answering dialog by invoking a $(j+1)^{th}$ sub-transformer encoder in the $(i+1)^{th}$ multimodal incremental transformer encoder, to obtain a $(j+1)^{th}$ intermediate representation vector, the $(j+1)^{th}$ intermediate representation vector being another vector corresponding to the $(i+1)^{th}$ round of historical question answering dialog, $j+1 \le K$; and determining a $K^{th}$ intermediate representation vector obtained by iterating j as the state vector corresponding to the $(i+1)^{th}$ round of historical question answering dialog.

17. The electronic device according to claim 16, wherein the performing multimodal encoding on the $j^{th}$ intermediate representation vector, the image feature, and the state vector corresponding to the $i^{th}$ round of historical question answering dialog by invoking a $(j+1)^{th}$ sub-transformer encoder in the $(i+1)^{th}$ multimodal incremental transformer encoder, to obtain a $(j+1)^{th}$ intermediate representation vector comprises:

performing intermediate encoding on the $j^{th}$ intermediate representation vector by invoking the $(j+1)^{th}$ sub-transformer encoder in the $(i+1)^{th}$ multimodal incremental transformer encoder, to obtain a first subvector;

performing intermediate encoding on the first subvector and the image feature, to obtain a second subvector;

performing intermediate encoding on the second subvector and the state vector corresponding to the $i^{th}$ round of historical question answering dialog, to obtain a third subvector; and performing intermediate encoding on the third subvector, to obtain the $(j+1)^{th}$ intermediate representation vector.

18. The electronic device according to claim 10, wherein the multimodal incremental transformer decoder comprises T sub-transformer decoders, T being a positive integer; and the performing multimodal decoding on the state vector corresponding to the current round of questioning, the image feature, and the character string feature by invoking the multimodal incremental transformer decoder, to obtain a decoded feature vector comprises:

acquiring an $m^{th}$ intermediate representation vector, the $m^{th}$ intermediate representation vector being obtained by performing multimodal decoding on the state vector corresponding to the current round of questioning, the image feature, and the character string feature m times, m being a positive integer, an initial value of m being 1;

iterating m, and performing multimodal decoding on the $m^{th}$ intermediate representation vector, the image feature, and the state vector corresponding to the current round of questioning by invoking an $(m+1)^{th}$ sub-transformer decoder in the multimodal incremental transformer decoder, to obtain an $(m+1)^{th}$ intermediate representation vector, $m+1 \le T$; and determining a $T^{th}$ intermediate representation vector obtained by iterating m as the decoded feature vector.

19. The non-transitory computer-readable storage medium according to claim 14, wherein the $(i+1)^{th}$ multimodal incremental transformer encoder comprises K sub-transformer encoders, K being a positive integer; and the performing multimodal encoding on the image feature, the state vector corresponding to the $i^{th}$ round of historical question answering dialog, and a question answering feature corresponding to an $(i+1)^{th}$ round of historical question answering dialog by invoking an $(i+1)^{th}$ multimodal incremental transformer encoder in the visual dialog model, to obtain a state vector corresponding to the $(i+1)^{th}$ round of historical question answering dialog comprises:

acquiring a $j^{th}$ intermediate representation vector, the $j^{th}$ intermediate representation vector being obtained by performing multimodal encoding on the image feature, the state vector corresponding to the $i^{th}$ round of historical question answering dialog, and the question answering feature corresponding to the $(i+1)^{th}$ round of historical question answering dialog j times, the $j^{th}$ intermediate representation vector being a vector corresponding to the $(i+1)^{th}$ round of historical question answering dialog, j being a positive integer, an initial value of j being 1;

iterating j, and performing multimodal encoding on the $j^{th}$ intermediate representation vector, the image feature, and the state vector corresponding to the $i^{th}$ round of historical question answering dialog by invoking a $(j+1)^{th}$ sub-transformer encoder in the $(i+1)^{th}$ multimodal incremental transformer encoder, to obtain a $(j+1)^{th}$ intermediate representation vector, the $(j+1)^{th}$ intermediate representation vector being another vector corresponding to the $(i+1)^{th}$ round of historical question answering dialog, $j+1 \le K$; and determining a $K^{th}$ intermediate representation vector obtained by iterating j as the state vector corresponding to the $(i+1)^{th}$ round of historical question answering dialog.

20. The non-transitory computer-readable storage medium according to claim 13, wherein the multimodal incremental transformer decoder comprises T sub-transformer decoders, T being a positive integer; and the performing multimodal decoding on the state vector corresponding to the current round of questioning, the image feature, and the character string feature by invoking the multimodal incremental transformer decoder, to obtain a decoded feature vector comprises:

acquiring an $m^{th}$ intermediate representation vector, the $m^{th}$ intermediate representation vector being obtained by performing multimodal decoding on the state vector corresponding to the current round of questioning, the image feature, and the character string feature m times, m being a positive integer, an initial value of m being 1;

iterating m, and performing multimodal decoding on the $m^{th}$ intermediate representation vector, the image feature, and the state vector corresponding to the current round of questioning by invoking an $(m+1)^{th}$ sub-transformer decoder in the multimodal incremental transformer decoder, to obtain an $(m+1)^{th}$ intermediate representation vector, $m+1 \leq T$; and determining a $T^{th}$ intermediate representation vector obtained by iterating m as the decoded feature vector.

* * * * *